United States Patent
Wu et al.

(10) Patent No.: US 11,375,529 B2
(45) Date of Patent: Jun. 28, 2022

(54) METHOD AND DEVICE FOR WIRELESS COMMUNICATION IN UE AND BASE STATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 96 days.

(21) Appl. No.: 16/932,817

(22) Filed: Jul. 19, 2020

(65) Prior Publication Data
US 2020/0351922 A1 Nov. 5, 2020

Related U.S. Application Data

(63) Continuation of application No. PCT/CN2018/073774, filed on Jan. 23, 2018.

(51) Int. Cl.
*H04W 72/12* (2009.01)
*H04B 7/0456* (2017.01)
(Continued)

(52) U.S. Cl.
CPC ...... *H04W 72/1273* (2013.01); *H04B 7/0482* (2013.01); *H04W 72/0446* (2013.01); *H04W 72/0453* (2013.01); *H04W 92/10* (2013.01)

(58) Field of Classification Search
CPC ... H04L 5/0048; H04L 5/0092; H04L 1/0003; H04L 1/0009; H04L 1/1861; H04L 5/0046; H04L 5/0057; H04L 5/0078
See application file for complete search history.

(56) References Cited

U.S. PATENT DOCUMENTS

2011/0032839 A1   2/2011  Chen et al.
2012/0327783 A1*  12/2012 Moon ............... H04L 1/1861
                                              370/241
(Continued)

FOREIGN PATENT DOCUMENTS

CN   101291163 A   10/2008
CN   102769510 A   11/2012
(Continued)

OTHER PUBLICATIONS

ISR received in application No. PCT/CN2018/073774 dated Sep. 19, 2018.

*Primary Examiner* — Romani Ohri

(57) ABSTRACT

The disclosure provides a method and a device in a User Equipment (UE) and a base station for wireless communication. The UE receives first information, receives a first signaling and transmits a first radio signal. The first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based. The above method has following benefits: when multiple TRPs serve one UE simultaneously, each TRP can select an optimal precoding mode depending on its own actual condition.

20 Claims, 17 Drawing Sheets

(51) Int. Cl.
*H04W 72/04* (2009.01)
*H04W 92/10* (2009.01)

(56) References Cited

U.S. PATENT DOCUMENTS

2020/0068549 A1* 2/2020 Kang .................. H04B 7/0695
2020/0343950 A1* 10/2020 Zhu ........................ H04L 5/005
2020/0366446 A1* 11/2020 Matsumura ....... H04W 72/0413

FOREIGN PATENT DOCUMENTS

| | | |
|---|---|---|
| CN | 104284445 A | 1/2015 |
| CN | 107404369 A | 11/2017 |
| WO | WO-2018017163 A1 * | 1/2018 ............ H04W 64/00 |

* cited by examiner

METHOD AND DEVICE FOR WIRELESS COMMUNICATION IN UE AND BASE STATION

CROSS REFERENCE TO RELATED APPLICATIONS

This application is a continuation of International Application No. PCT/CN2018/073774, filed Jan. 23, 2018, claims the priority benefit of International Patent Application No. PCT/CN2018/073774, filed on Jan. 23, 2018, the full disclosure of which is incorporated herein by reference.

BACKGROUND

Technical Field

The disclosure relates to methods and devices in wireless communication systems, and in particular to a method and a device in a wireless communication system supporting multiantenna transmission.

Related Art

In Long Term Evolution (LTE) systems, codebook-based precoding is one important means to realize multiantenna transmission and it plays an important role in uplink transmission and downlink transmission. In codebook-based precoding technologies, both parties of communication need to know (partial) channel information of wireless channels. In conventional LTE systems, one most common method to acquire channel information is that a receiving end of a radio signal estimates channel state information by measuring a reference signal and then feeds back/notifies the estimated channel state information to a transmitting end of the radio signal. In New Radio (NR) systems, due to a sharp increase in the number of antennas, the channel estimation and feedback/notification overheads needed by the codebook-based precoding also increase. In order to reduce overheads and improve precoding precisions, non-codebook-based precoding is discussed in 3rd Generation Partner Project (3GPP) Radio Access Network (RAN) 1. According to the discussion results of the 3GPP RAN 1, both codebook-based precoding and non-codebook-based precoding will be supported in NR systems.

SUMMARY

The inventor finds through researches that, when a User Equipment (UE) can communicate with multiple Transmitter Receiver Points (TRPs), different TRPs may select different precoding modes, specifically, some TRPs select codebook-based precoding modes while the other TRPs select non-codebook-based precoding modes. Since the codebook-based precoding and the non-codebook-based precoding need different scheduling information, one UE that supports precoding transmissions based on both codebook and non-codebook will have increased complexity in blind detection of scheduling signalings.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, comprising:
 receiving first information;
 receiving a first signaling; and
 transmitting a first radio signal.

Herein, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

According to one aspect of the disclosure, the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

According to one aspect of the disclosure, the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

According to one aspect of the disclosure, the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s).

According to one aspect of the disclosure, the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

According to one aspect of the disclosure, when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

According to one aspect of the disclosure, the first signaling includes a second field, the second field is used for determining K2 target antenna port group(s), any one transmitting antenna port of the first radio signal is QCLed with one antenna port in the K2 target antenna port group(s), and the K2 is a positive integer.

The disclosure provides a method in a base station for wireless communication, wherein the method includes:
transmitting first information;
transmitting a first signaling; and
receiving a first radio signal.

Herein, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

According to one aspect of the disclosure, the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

According to one aspect of the disclosure, the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

According to one aspect of the disclosure, the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);

According to one aspect of the disclosure, the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

According to one aspect of the disclosure, when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

According to one aspect of the disclosure, the first signaling includes a second field, the second field is used for determining K2 target antenna port group(s), any one transmitting antenna port of the first radio signal is QCLed with one antenna port in the K2 target antenna port group(s), and the K2 is a positive integer.

The disclosure provides a UE for wireless communication, wherein the UE includes:
a first receiver, to receive first information;
a second receiver, to receive a first signaling; and
a first transmitter, to transmit a first radio signal.

Herein, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the above UE for wireless communication is characterized in that: the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

In one embodiment, the above UE for wireless communication is characterized in that: the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

In one embodiment, the above UE for wireless communication is characterized in that: the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s).

In one embodiment, the above UE for wireless communication is characterized in that: the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

In one embodiment, the above UE for wireless communication is characterized in that: when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

In one embodiment, the above UE for wireless communication is characterized in that: the first signaling includes a second field, the second field is used for determining K2 target antenna port group(s), any one transmitting antenna port of the first radio signal is QCLed with one antenna port in the K2 target antenna port group(s), and the K2 is a positive integer.

The disclosure provides a base station for wireless communication, wherein the base station includes:

a second transmitter, to transmit first information;
a third transmitter, to transmit a first signaling; and
a third receiver, to a first radio signal.

Herein, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the above base station for wireless communication is characterized in that: the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

In one embodiment, the above base station for wireless communication is characterized in that: the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

In one embodiment, the above base station for wireless communication is characterized in that: the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);

In one embodiment, the above base station for wireless communication is characterized in that: the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

In one embodiment, the above base station for wireless communication is characterized in that: when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

In one embodiment, the above base station for wireless communication is characterized in that: the first signaling includes a second field, the second field is used for determining K2 target antenna port group(s), any one transmitting antenna port of the first radio signal is QCLed with one antenna port in the K2 target antenna port group(s), and the K2 is a positive integer.

In one embodiment, compared with conventional schemes, the disclosure has the following benefits.

One UE can support both codebook-based precoding and non-codebook-based precoding. When multiple TRP serve one UE simultaneously, each TRP can select an optimal precoding mode depending on its own actual condition, thus transmission qualities between each TRP and the UE are fully optimized.

Whether a signaling format of a scheduling signaling is a signaling format corresponding to codebook-based precoding or a signaling format corresponding to non-codebook-based precoding may be determined according to a CORESET or a search space where the scheduling signaling is located or a transmitting beam employed by a control channel where the scheduling signaling is located; in one CORESET or search space, it is needed to perform a blind detection of a scheduling signaling format corresponding to one precoding mode only, thus the complexity of blind detection of the UE is reduced.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
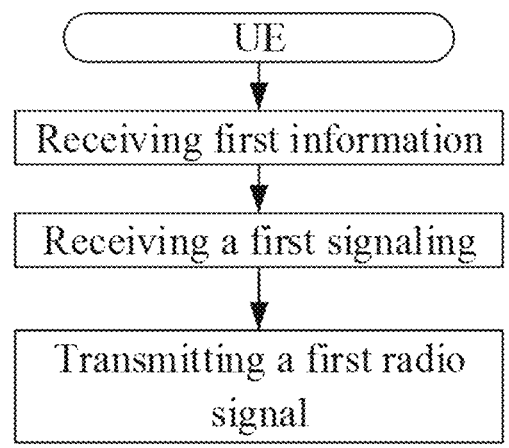
FIG. 1 is a flowchart of first information, a first signaling and a first radio signal according to one embodiment of the disclosure.

Embodiment 1 illustrates a flowchart of first information, a first signaling and a first radio signal, as shown in FIG. 1.

In Embodiment 1, the UE in the disclosure receives first information, receives a first signaling, and transmits a first radio signal. Herein, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the first information is carried by a high layer signaling.

In one embodiment, the first information is carried by a higher layer signaling.

In one embodiment, the first information is carried by a Radio Resource Control (RRC) signaling.

In one embodiment, the first information is carried by a Medium Access Control layer Control Element (MACCE) signaling.

In one embodiment, the first information indicates explicitly the first air interface resource and the second air interface resource.

In one embodiment, the first information indicates implicitly the first air interface resource and the second air interface resource.

In one embodiment, scheduling information of the first radio signal includes at least one of occupied time domain resources, occupied frequency domain resources, a Modulation and Coding Scheme (MCS), a Hybrid Automatic Repeat request (HARQ) process number, a Redundancy Version (RV), a New Data Indicator (NDI), a DeModulation Reference Signal (DMRS) sequence or a transmitting antenna port.

In one embodiment, the phrase that the scheduling information of the first radio signal is codebook-based precoding refers that: the generation of the first radio signal is codebook-based.

In one embodiment, the phrase that the scheduling information of the first radio signal is codebook-based refers that: precoding of the first radio signal is codebook-based precoding.

In one embodiment, the phrase that the scheduling information of the first radio signal is codebook-based refers that: the first radio signal is generated by codebook-based precoding.

In one embodiment, the specific definition of the codebook can refer to Chapter 6.3.4 in 3GPP TS36.211.

In one embodiment, one codebook includes a positive integer number of vector(s) or a positive integer number of matrix(es).

In one embodiment, the phrase that the scheduling information of the first radio signal is non-codebook-based refers that: the generation of the first radio signal is non-codebook-based.

In one embodiment, the phrase that the scheduling information of the first radio signal is non-codebook-based refers that: precoding of the first radio signal is non-codebook-based precoding.

In one embodiment, the phrase that the scheduling information of the first radio signal is non-codebook-based refers that: the first radio signal is generated by non-codebook-based precoding.

In one embodiment, the first air interface resource includes the M1 antenna port group(s) and the first time-frequency resource set, and the second air interface resource includes the M2 antenna port group(s) and the second time-frequency resource set.

In one embodiment, the first air interface resource consists of the M1 antenna port group(s) and the first time-frequency resource set, and the second air interface resource consists of the M2 antenna port group(s) and the second time-frequency resource set.

In one embodiment, the first air interface resource includes the M1 antenna port group(s), and the second air interface resource includes the M2 antenna port group(s).

In one embodiment, the first air interface resource consists of the M1 antenna port group(s), and the second air interface resource consists of the M2 antenna port group(s).

In one embodiment, the first air interface resource includes the first time-frequency resource set, and the second air interface resource includes the second time-frequency resource set.

In one embodiment, the first air interface resource consists of the first time-frequency resource set, and the second air interface resource consists of the second time-frequency resource set.

In one embodiment, the first signaling is a physical layer signaling.

In one embodiment, the first signaling is a dynamic signaling.

In one embodiment, the first signaling is a dynamic signaling for uplink grant.

In one embodiment, the first signaling includes Downlink Control Information (DCI).

In one embodiment, the first signaling includes a DCI for uplink grant.

In one embodiment, a signaling format of the first signaling in the condition that the scheduling information of the first radio signal is codebook-based is different from a signaling format of the first signaling in the condition that the scheduling information of the first radio signal is non-codebook-based In one embodiment, a payload size of the first signaling in the condition that the scheduling information of the first radio signal is codebook-based is different from a payload size of the first signaling in the condition that the scheduling information of the first radio signal is non-codebook-based.

In one embodiment, a payload size of the first signaling in the condition that the scheduling information of the first radio signal is codebook-based is greater than a payload size of the first signaling in the condition that the scheduling information of the first radio signal is non-codebook-based.

In one embodiment, the M1 is equal to 1.

In one embodiment, the M1 is greater than 1.

In one embodiment, the M2 is equal to 1.

In one embodiment, the M2 is greater than 1.

In one embodiment, one time-frequency resource includes a positive integer number of multicarrier symbol(s) in time domain and includes a positive integer number of subcarrier(s) in frequency domain.

In one embodiment, time-frequency resources occupied by the first signaling belong to one COntrol REsource SET (CORESET).

In one embodiment, time-frequency resources occupied by the first signaling belong to one dedicated CORESET.

In one embodiment, time-frequency resources occupied by the first signaling belong to one Searchspace.

In one embodiment, time-frequency resources occupied by the first signaling belong to one dedicated Searchspace.

In one embodiment, the first radio signal includes at least one of uplink data and an uplink reference signal.

In one subembodiment, the uplink reference signal includes a DMRS.

In one subembodiment, the uplink reference signal includes a Phase error TrackingReferenceSignal (PTRS).

In one embodiment, the first information is transmitted on a downlink physical layer data channel (that is, a downlink channel capable of carrying physical layer data).

In one subembodiment, the downlink physical layer data channel is a Physical Downlink Shared Channel (PDSCH).

In one subembodiment, the downlink physical layer data channel is a short PDSCH (sPDSCH).

In one subembodiment, the downlink physical layer data channel is a NewRadio PDSCH (NR-PDSCH).

In one subembodiment, the downlink physical layer data channel is a NarrowBand PDSCH (NB-PDSCH).

In one embodiment, the first signaling is transmitted on a downlink physical layer control channel (that is, a downlink channel capable of carrying physical layer signalings only).

In one subembodiment, the downlink physical layer control channel is a Physical DownlinkControl Channel (PDCCH).

In one subembodiment, the downlink physical layer control channel is a short PDCCH (sPDCCH).

In one subembodiment, the downlink physical layer control channel is a NewRadio PDCCH (NR-PDCCH).

In one subembodiment, the downlink physical layer control channel is a NarrowBand PDCCH (NB-PDCCH).

In one embodiment, the first radio signal is transmitted on an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a NewRadio PUSCH (NR-PDSCH).

In one subembodiment, the uplink physical layer data channel is a NarrowBand PUSCH (NB-PUSCH).

In one embodiment, a transport channel corresponding to the first radio signal is an UpLinkShared Channel (UL-SCH).

Embodiment 2

Figure 2:
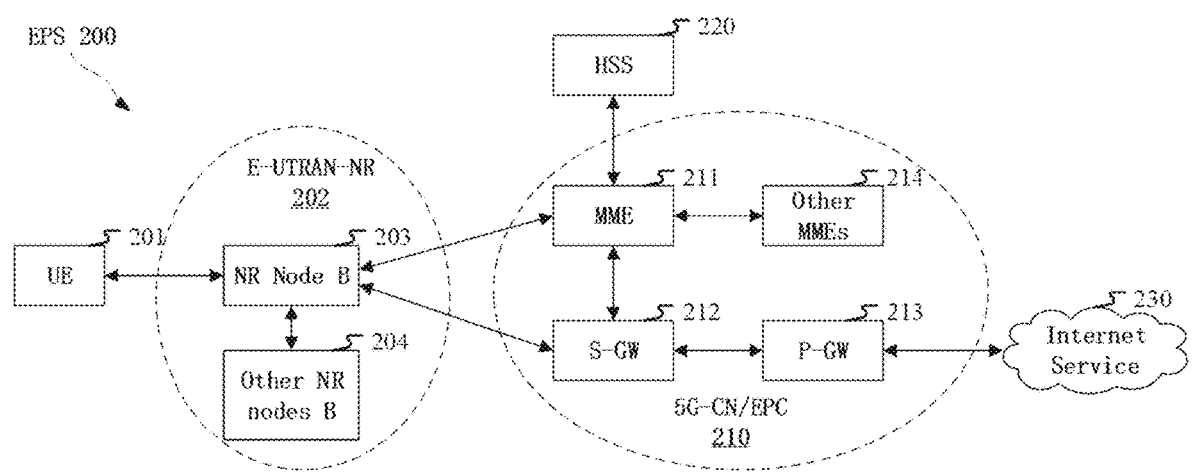
FIG. 2 is a diagram illustrating a network architecture according to one embodiment of the disclosure.

Embodiment 2 illustrates a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponding to the UE in the disclosure.

In one embodiment, the gNB 203 corresponds to the base station in the disclosure.

In one subembodiment, the UE 201 supports codebook-based precoding and non-codebook-based precoding.

In one subembodiment, the gNB 203 supports codebook-based precoding and non-codebook-based precoding.

Embodiment 3

Figure 3:
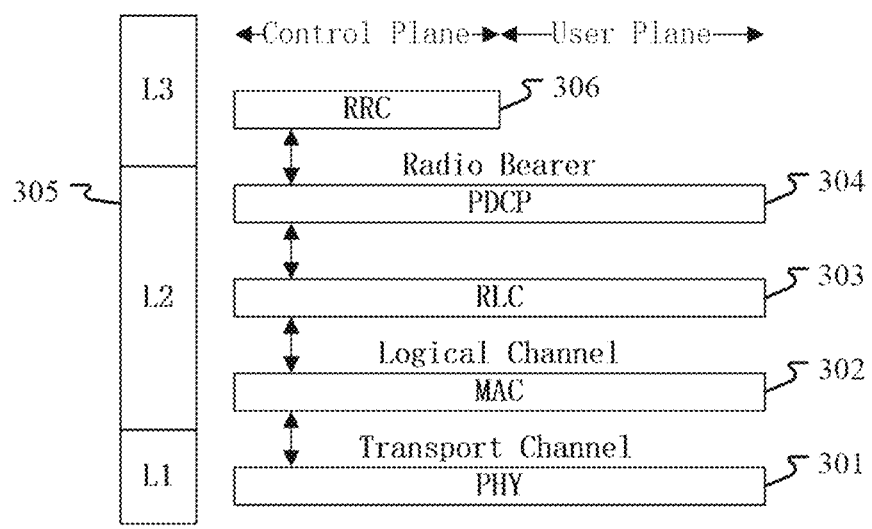
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first information in the disclosure is generated on the MAC sublayer 302.

In one embodiment, the first information in the disclosure is generated on the RRC sublayer 306.

In one embodiment, the first signaling in the disclosure is generated on the PHY 301.

In one embodiment, the first radio signal in the disclosure is generated on the PHY 301.

Embodiment 4

Figure 4:
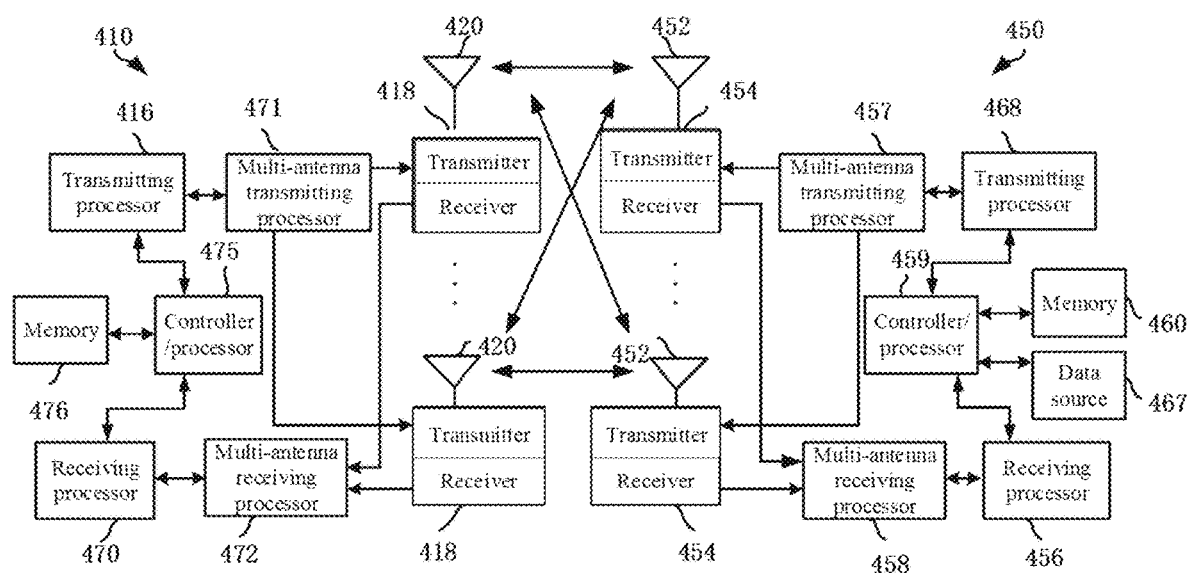
FIG. 4 is a diagram illustrating an NR node and a UE according to one embodiment of the disclosure.

Embodiment 4 illustrates a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and antenna 452.

In Downlink (DL), at the gNB 410, a higher-layer packet from a core network is provided to the controller/processor 475. The controller/processor 475 provides functions of Layer 2. In DL, the controller/processor 475 provides header compression, encryption, packet segmentation and reordering, multiplexing between a logical channel and a transport channel, and a radio resource allocation for the UE 450 based on various priority metrics. The controller/processor 475 is also in charge of retransmission of lost packets, and signalings to the UE 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the UE 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including codebook-based precoding and precoding non-codebook-based precoding) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In DL, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In Uplink (UL), at the UE 450, the data source 467 provides a higher-layer packet to the controller/processor 459. The data source 467 illustrates all protocol layers above the L2 layer. Similar as the transmitting function of the gNB 410 described in DL, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of HARQ operations, retransmission of lost packets, and signalings to the gNB 410. The transmitting processor 468 conducts modulation mapping and channel encoding processing; the multi-antenna transmitting processor 457 performs digital multi-antenna spatial precoding (including codebook-based precoding and non-codebook-based precoding) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In UL, the function of the gNB 410 is similar as the receiving function of the UE 450 described in DL. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In UL, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives the first information in the disclosure, receives the first signaling in the disclosure, and transmits the first radio signal in the disclosure. The first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set.

In one embodiment, the UE 450 includes a memory that stores a computer readable instruction program. The computer readable instruction program generates an action when executed by at least one processor. The action includes: receiving the first information in the disclosure, receiving the first signaling in the disclosure, and transmitting the first radio signal in the disclosure. The first information is used for determining a first air interface resource and a second air interface resource, and the first signaling includes scheduling information of the first radio signal; in instances in which the first radio signal is related to the first air interface resource, the scheduling information of the first radio signal is codebook based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set.

In one embodiment, the gNB 410 includes at least one processor and at least one memory. The at least one memory includes computer program codes. The at least one memory and the computer program codes are configured to be used in collaboration with the at least one processor. The gNB 410 at least transmits the first information in the disclosure, transmits the first signaling in the disclosure, and receives the first radio signal in the disclosure. The first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set.

In one embodiment, the gNB 410 includes a memory that stores a computer readable instruction program. The computer readable instruction program generates an action when executed by at least one processor. The action includes: transmitting the first information in the disclosure, transmitting the first signaling in the disclosure, and receiving the first radio signal in the disclosure. The first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set.

In one embodiment, the UE 450 corresponds to the UE in the disclosure.

In one embodiment, the gNB 410 corresponds to the base station in the disclosure.

In one embodiment, at least one of the antenna 452, the receiver 454, the receiving processor 456, the multiantenna receiving processor 458 or the controller/processor 459 is used for receiving the first information in the disclosure; and at least one of the antenna 420, the transmitter 418, the transmitting processor 416, the multiantenna transmitting processor 471 or the controller/processor 475 is used for transmitting the first information in the disclosure.

In one embodiment, at least one of the antenna 452, the receiver 454, the receiving processor 456, the multiantenna receiving processor 458 or the controller/processor 459 is used for receiving the first signaling in the disclosure; and at least one of the antenna 420, the transmitter 418, the transmitting processor 416, the multiantenna transmitting processor 471 or the controller/processor 475 is used for transmitting the first signaling in the disclosure.

In one embodiment, at least one of the antenna 420, the receiver 418, the receiving processor 470, the multiantenna receiving processor 472 or the controller/processor 475 is used for receiving the first radio signal in the disclosure; and at least one of the antenna 452, the transmitter 454, the transmitting processor 468, the multiantenna transmitting processor 457 or the controller/processor 459 is used for transmitting the first radio signal in the disclosure.

Embodiment 5

Figure 5:
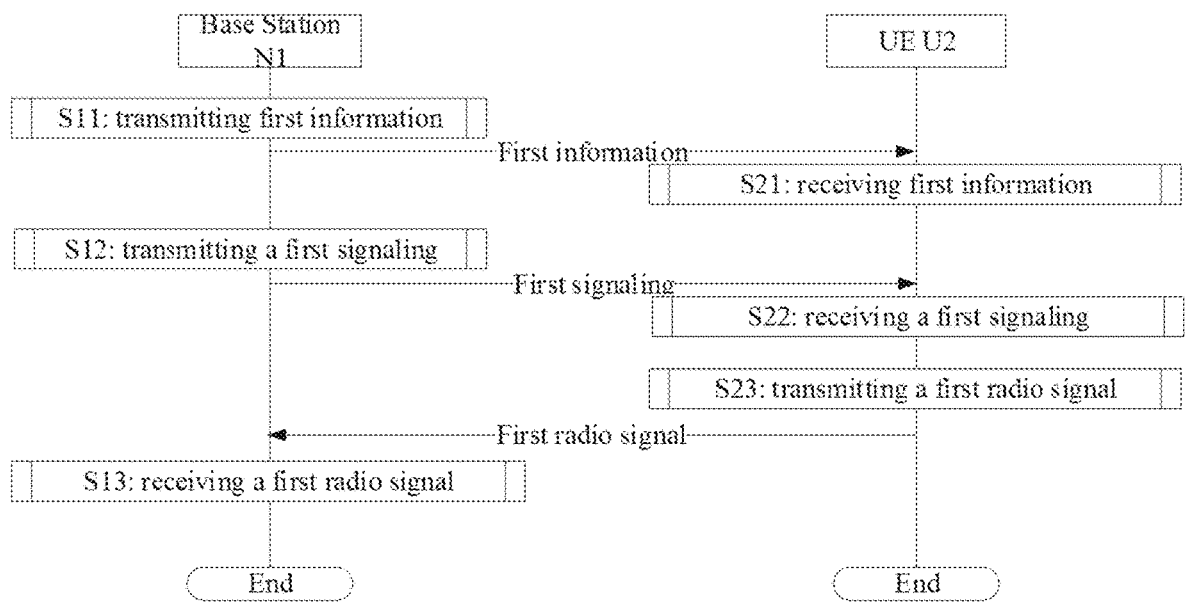
FIG. 5 is a flowchart of wireless transmission according to one embodiment of the disclosure.

Embodiment 5 illustrates a flowchart of wireless transmission, as shown in FIG. 5. In FIG. 5, a base station N1 is a maintenance base station for a serving cell of a UE U2.

The N1 transmits first information in S11, transmits a first signaling in S12, and receives a first radio signal in S13.

The U2 receives first information in S21, receives a first signaling in S22, and transmits a first radio signal in S23.

In Embodiment 5, the first information is used by the U2 to determine a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is noncodebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

In one embodiment, the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

In one embodiment, the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s).

In one subembodiment, when the first radio signal is related to the first air interface resource, any one transmitting antenna port of the first radio signal is QCLed with one antenna port in the M1 antenna port group(s).

In one subembodiment, when the first radio signal is related to the second air interface resource, any one transmitting antenna port of the first radio signal is QCLed with one antenna port in the M2 antenna port group(s).

In one subembodiment, when the first radio signal is related to the first air interface resource, at least one transmitting antenna port of a DMRS on a physical layer channel transmitting the first signaling is QCLed with one antenna port in the M1 antenna port group(s).

In one subembodiment, when the first radio signal is related to the first air interface resource, any one transmitting antenna port of a DMRS on a physical layer channel transmitting the first signaling is QCLed with one antenna port in the M1 antenna port group(s).

In one subembodiment, when the first radio signal is related to the second air interface resource, at least one transmitting antenna port of a DMRS on a physical layer channel transmitting the first signaling is QCLed with one antenna port in the M2 antenna port group(s).

In one subembodiment, when the first radio signal is related to the second air interface resource, any one transmitting antenna port of a DMRS on a physical layer channel transmitting the first signaling is QCLed with one antenna port in the M2 antenna port group(s).

In one embodiment, the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

In one subembodiment, when the first radio signal is related to the first air interface resource, any one transmitting antenna port of the first radio signal is QCLed with one antenna port in the M1 antenna port group(s).

In one subembodiment, when the first radio signal is related to the second air interface resource, any one transmitting antenna port of the first radio signal is QCLed with one antenna port in the M2 antenna port group(s).

In one subembodiment, when the first radio signal is related to the first air interface resource, at least one transmitting antenna port of a DMRS on a physical layer channel transmitting the first radio signal is QCLed with one antenna port in the M1 antenna port group(s).

In one subembodiment, when the first radio signal is related to the first air interface resource, any one transmitting antenna port of a DMRS on a physical layer channel transmitting the first radio signal is QCLed with one antenna port in the M1 antenna port group(s).

In one subembodiment, when the first radio signal is related to the second air interface resource, at least one transmitting antenna port of a DMRS on a physical layer channel transmitting the first radio signal is QCLed with one antenna port in the M2 antenna port group(s).

In one subembodiment, when the first radio signal is related to the second air interface resource, any one transmitting antenna port of a DMRS on a physical layer channel transmitting the first radio signal is QCLed with one antenna port in the M2 antenna port group(s).

In one embodiment, the phrase that two antenna ports are QCLed refers that the two antenna ports are Quasi Co-Located.

In one embodiment, the phrase that two antenna ports are QCLed refers that the two antenna ports are Spatially QCLed.

In one embodiment, the phrase that the first radio signal is related to the first air interface resource refers that: time-frequency resources occupied by the first signaling belong to the first time-frequency resource set.

In one embodiment, the phrase that second first radio signal is related to the second air interface resource refers that: time-frequency resources occupied by the first signaling belong to the second time-frequency resource set.

In one embodiment, the phrase that the first radio signal is related to the first air interface resource refers that: time-frequency resources occupied by the first radio signal belong to the first time-frequency resource set.

In one embodiment, the phrase that the first radio signal is related to the second air interface resource refers that: time-frequency resources occupied by the first radio signal belong to the second time-frequency resource set.

In one embodiment, the phrase that the first radio signal is related to the first air interface resource refers that: time-frequency resources occupied by the first signaling and time-frequency resources occupied by the first radio signal both belong to the first time-frequency resource set.

In one embodiment, the phrase that the first radio signal is related to the second air interface resource refers that:

time-frequency resources occupied by the first signaling and time-frequency resources occupied by the first radio signal both belong to the second time-frequency resource set.

In one embodiment, the phrase that the first radio signal is related to the first air interface resource refers that: at least one transmitting antenna port of a DMRS on a physical layer channel transmitting the first signaling is QCLed with one antenna port in the M1 antenna port group(s).

In one embodiment, the phrase that the first radio signal is related to the first air interface resource refers that: any one transmitting antenna port of a DMRS on a physical layer channel transmitting the first signaling is QCLed with one antenna port in the M1 antenna port group(s).

In one embodiment, the phrase that the first radio signal is related to the first air interface resource refers that: at least one transmitting antenna port of the first signaling is QCLed with one antenna port in the M1 antenna port group(s).

In one embodiment, the phrase that the first radio signal is related to the first air interface resource refers that: any one transmitting antenna port of the first signaling is QCLed with one antenna port in the M1 antenna port group(s).

In one embodiment, the phrase that the first radio signal is related to the first air interface resource refers that: at least one transmitting antenna port of the first signaling is QCLed with one antenna port in the M1 antenna port group(s), and time-frequency resources occupied by the first signaling belong to the first time-frequency resource set.

In one embodiment, the phrase that the first radio signal is related to the first air interface resource refers that: any one transmitting antenna port of the first signaling is QCLed with one antenna port in the M1 antenna port group(s), and time-frequency resources occupied by the first signaling belong to the first time-frequency resource set.

In one embodiment, the phrase that the first radio signal is related to the first air interface resource refers that: at least one transmitting antenna port of the first signaling is QCLed with one antenna port in the M1 antenna port group(s), and time-frequency resources occupied by the first radio signal belong to the first time-frequency resource set.

In one embodiment, the phrase that the first radio signal is related to the first air interface resource refers that: any one transmitting antenna port of the first signaling is QCLed with one antenna port in the M1 antenna port group(s), and time-frequency resources occupied by the first radio signal belong to the first time-frequency resource set.

In one embodiment, the phrase that the first radio signal is related to the first air interface resource refers that: at least one transmitting antenna port of the first signaling is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the first air interface resource refers that: any one transmitting antenna port of the first signaling is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the second air interface resource refers that: at least one transmitting antenna port of a DMRS on a physical layer channel transmitting the first signaling is QCLed with one antenna port in the M2 antenna port group(s).

In one embodiment, the phrase that the first radio signal is related to the second air interface resource refers that: any one transmitting antenna port of a DMRS on a physical layer channel transmitting the first signaling is QCLed with one antenna port in the M2 antenna port group(s).

In one embodiment, the phrase that the first radio signal is related to the second air interface resource refers that: at least one transmitting antenna port of the first signaling is QCLed with one antenna port in the M2 antenna port group(s).

In one embodiment, the phrase that the first radio signal is related to the second air interface resource refers that: any one transmitting antenna port of the first signaling is QCLed with one antenna port in the M2 antenna port group(s).

In one embodiment, the phrase that the first radio signal is related to the second air interface resource refers that: at least one transmitting antenna port of the first signaling is QCLed with one antenna port in the M2 antenna port group(s), and time-frequency resources occupied by the first signaling belong to the second time-frequency resource set.

In one embodiment, the phrase that the first radio signal is related to the second air interface resource refers that: any one transmitting antenna port of the first signaling is QCLed with one antenna port in the M2 antenna port group(s), and time-frequency resources occupied by the first signaling belong to the second time-frequency resource set.

In one embodiment, the phrase that the first radio signal is related to the second air interface resource refers that: at least one transmitting antenna port of the first signaling is QCLed with one antenna port in the M2 antenna port group(s), and time-frequency resources occupied by the first radio signal belong to the second time-frequency resource set.

In one embodiment, the phrase that the first radio signal is related to the second air interface resource refers that: any one transmitting antenna port of the first signaling is QCLed with one antenna port in the M2 antenna port group(s), and time-frequency resources occupied by the first radio signal belong to the second time-frequency resource set.

In one embodiment, the phrase that the first radio signal is related to the second air interface resource refers that: at least one transmitting antenna port of the first signaling is QCLed with one antenna port in the M2 antenna port group(s), time-frequency resources occupied by the first signaling and time-frequency resources occupied by the first radio signal both belong to the second time-frequency resource set.

In one embodiment, the phrase that the first radio signal is related to the second air interface resource refers that: any one transmitting antenna port of the first signaling is QCLed with one antenna port in the M2 antenna port group(s), time-frequency resources occupied by the first signaling and time-frequency resources occupied by the first radio signal both belong to the second time-frequency resource set.

In one embodiment, the phrase that the first radio signal is related to the first air interface resource refers that: at least one transmitting antenna port of a DMRS on a physical layer channel transmitting the first radio signal is QCLed with one antenna port in the M1 antenna port group(s).

In one embodiment, the phrase that the first radio signal is related to the first air interface resource refers that: any one transmitting antenna port of a DMRS on a physical layer channel transmitting the first radio signal is QCLed with one antenna port in the M1 antenna port group(s).

In one embodiment, the phrase that the first radio signal is related to the first air interface resource refers that: at least one transmitting antenna port of the first radio signal is QCLed with one antenna port in the M1 antenna port group(s).

In one embodiment, the phrase that the first radio signal is related to the first air interface resource refers that: any one transmitting antenna port of the first radio signal is QCLed with one antenna port in the M1 antenna port group(s).

In one embodiment, the phrase that the first radio signal is related to the first air interface resource refers that: at least one transmitting antenna port of the first radio signal is QCLed with one antenna port in the M1 antenna port group(s), and time-frequency resources occupied by the first signaling belong to the first time-frequency resource set.

In one embodiment, the phrase that the first radio signal is related to the first air interface resource refers that: any one transmitting antenna port of the first radio signal is QCLed with one antenna port in the M1 antenna port group(s), and time-frequency resources occupied by the first signaling belong to the first time-frequency resource set.

In one embodiment, the phrase that the first radio signal is related to the first air interface resource refers that: at least one transmitting antenna port of the first radio signal is QCLed with one antenna port in the M1 antenna port group(s), and time-frequency resources occupied by the first radio signal belong to the first time-frequency resource set.

In one embodiment, the phrase that the first radio signal is related to the first air interface resource refers that: any one transmitting antenna port of the first radio signal is QCLed with one antenna port in the M1 antenna port group(s), and time-frequency resources occupied by the first radio signal belong to the first time-frequency resource set.

In one embodiment, the phrase that the first radio signal is related to the first air interface resource refers that: at least one transmitting antenna port of the first radio signal is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the first air interface resource refers that: any one transmitting antenna port of the first radio signal is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the first air interface resource refers that: at least one transmitting antenna port of the first radio signal is QCLed with one antenna port in the M1 antenna port group(s), at least one transmitting antenna port of the first signaling is QCLed with one antenna port in the M1 antenna port group(s).

In one embodiment, the phrase that the first radio signal is related to the first air interface resource refers that: any one transmitting antenna port of the first radio signal is QCLed with one antenna port in the M1 antenna port group(s), any one transmitting antenna port of the first signaling is QCLed with one antenna port in the M1 antenna port group(s).

In one embodiment, the phrase that the first radio signal is related to the first air interface resource refers that: at least one transmitting antenna port of the first radio signal is QCLed with one antenna port in the M1 antenna port group(s), at least one transmitting antenna port of the first signaling is QCLed with one antenna port in the M1 antenna port group(s), and time-frequency resources occupied by the first signaling belong to the first time-frequency resource set.

In one embodiment, the phrase that the first radio signal is related to the first air interface resource refers that: any one transmitting antenna port of the first radio signal is QCLed with one antenna port in the M1 antenna port group(s), any one transmitting antenna port of the first signaling is QCLed with one antenna port in the M1 antenna port group(s), and time-frequency resources occupied by the first signaling belong to the first time-frequency resource set.

In one embodiment, the phrase that the first radio signal is related to the first air interface resource refers that: at least one transmitting antenna port of the first radio signal is QCLed with one antenna port in the M1 antenna port group(s), at least one transmitting antenna port of the first signaling is QCLed with one antenna port in the M1 antenna port group(s), and time-frequency resources occupied by the first radio signal belong to the first time-frequency resource set.

In one embodiment, the phrase that the first radio signal is related to the first air interface resource refers that: any one transmitting antenna port of the first radio signal is QCLed with one antenna port in the M1 antenna port group(s), any one transmitting antenna port of the first signaling is QCLed with one antenna port in the M1 antenna port group(s), and time-frequency resources occupied by the first radio signal belong to the first time-frequency resource set.

In one embodiment, the phrase that the first radio signal is related to the first air interface resource refers that: at least one transmitting antenna port of the first radio signal is QCLed with one antenna port in the M1 antenna port group(s), at least one transmitting antenna port of the first signaling is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the first air interface resource refers that: any one transmitting antenna port of the first radio signal is QCLed with one antenna port in the M1 antenna port group(s), any one transmitting antenna port of the first signaling is QCLed with one antenna port in the M1 antenna port group(s), time-frequency resources occupied by the first signaling and time-frequency resources occupied by the first radio signal both belong to the first time-frequency resource set.

In one embodiment, the phrase that the first radio signal is related to the second air interface resource refers that: at least one transmitting antenna port of a DMRS on a physical layer channel transmitting the first radio signal is QCLed with one antenna port in the M2 antenna port group(s).

In one embodiment, the phrase that the first radio signal is related to the second air interface resource refers that: any one transmitting antenna port of a DMRS on a physical layer channel transmitting the first radio signal is QCLed with one antenna port in the M2 antenna port group(s).

In one embodiment, the phrase that the first radio signal is related to the second air interface resource refers that: at least one transmitting antenna port of the first radio signal is QCLed with one antenna port in the M2 antenna port group(s).

In one embodiment, the phrase that the first radio signal is related to the second air interface resource refers that: any one transmitting antenna port of the first radio signal is QCLed with one antenna port in the M2 antenna port group(s).

In one embodiment, the phrase that the first radio signal is related to the second air interface resource refers that: at least one transmitting antenna port of the first radio signal is QCLed with one antenna port in the M2 antenna port group(s), and time-frequency resources occupied by the first signaling belong to the second time-frequency resource set.

In one embodiment, the phrase that the first radio signal is related to the second air interface resource refers that: any one transmitting antenna port of the first radio signal is QCLed with one antenna port in the M2 antenna port group(s), and time-frequency resources occupied by the first signaling belong to the second time-frequency resource set.

In one embodiment, the phrase that the first radio signal is related to the second air interface resource refers that: at least one transmitting antenna port of the first radio signal is QCLed with one antenna port in the M2 antenna port group(s), and time-frequency resources occupied by the first radio signal belong to the second time-frequency resource set.

In one embodiment, the phrase that the first radio signal is related to the second air interface resource refers that: any one transmitting antenna port of the first radio signal is QCLed with one antenna port in the M2 antenna port group(s), and time-frequency resources occupied by the first radio signal belong to the second time-frequency resource set.

In one embodiment, the phrase that the first radio signal is related to the second air interface resource refers that: at least one transmitting antenna port of the first radio signal is QCLed with one antenna port in the M2 antenna port group(s), time-frequency resources occupied by the first signaling and time-frequency resources occupied by the first radio signal both belong to the second time-frequency resource set.

In one embodiment, the phrase that the first radio signal is related to the second air interface resource refers that: any one transmitting antenna port of the first radio signal is QCLed with one antenna port in the M2 antenna port group(s), time-frequency resources occupied by the first signaling and time-frequency resources occupied by the first radio signal both belong to the second time-frequency resource set.

In one embodiment, the phrase that the first radio signal is related to the second air interface resource refers that: at least one transmitting antenna port of the first radio signal is QCLed with one antenna port in the M2 antenna port group(s), at least one transmitting antenna port of the first signaling is QCLed with one antenna port in the M2 antenna port group(s).

In one embodiment, the phrase that the first radio signal is related to the second air interface resource refers that: any one transmitting antenna port of the first radio signal is QCLed with one antenna port in the M2 antenna port group(s), any one transmitting antenna port of the first signaling is QCLed with one antenna port in the M2 antenna port group(s).

In one embodiment, the phrase that the first radio signal is related to the second air interface resource refers that: at least one transmitting antenna port of the first radio signal is QCLed with one antenna port in the M2 antenna port group(s), at least one transmitting antenna port of the first signaling is QCLed with one antenna port in the M2 antenna port group(s), and time-frequency resources occupied by the first signaling belong to the second time-frequency resource set.

In one embodiment, the phrase that the first radio signal is related to the second air interface resource refers that: any one transmitting antenna port of the first radio signal is QCLed with one antenna port in the M2 antenna port group(s), any one transmitting antenna port of the first signaling is QCLed with one antenna port in the M2 antenna port group(s), and time-frequency resources occupied by the first signaling belong to the second time-frequency resource set.

In one embodiment, the phrase that the first radio signal is related to the second air interface resource refers that: at least one transmitting antenna port of the first radio signal is QCLed with one antenna port in the M2 antenna port group(s), at least one transmitting antenna port of the first signaling is QCLed with one antenna port in the M2 antenna port group(s), and time-frequency resources occupied by the first radio signal belong to the second time-frequency resource set.

In one embodiment, the phrase that the first radio signal is related to the second air interface resource refers that: any one transmitting antenna port of the first radio signal is QCLed with one antenna port in the M2 antenna port group(s), any one transmitting antenna port of the first signaling is QCLed with one antenna port in the M2 antenna port group(s), and time-frequency resources occupied by the first radio signal belong to the second time-frequency resource set.

In one embodiment, the phrase that the first radio signal is related to the second air interface resource refers that: at least one transmitting antenna port of the first radio signal is QCLed with one antenna port in the M2 antenna port group(s), at least one transmitting antenna port of the first signaling is QCLed with one antenna port in the M2 antenna port group(s), time-frequency resources occupied by the first signaling and time-frequency resources occupied by the first radio signal both belong to the second time-frequency resource set.

In one embodiment, the phrase that the first radio signal is related to the second air interface resource refers that: any one transmitting antenna port of the first radio signal is QCLed with one antenna port in the M2 antenna port group(s), any one transmitting antenna port of the first signaling is QCLed with one antenna port in the M2 antenna port group(s), time-frequency resources occupied by the first signaling and time-frequency resources occupied by the first radio signal both belong to the second time-frequency resource set.

In one embodiment, when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

In one embodiment, the first signaling includes a second field, the second field is used for determining K2 target antenna port group(s), any one transmitting antenna port of the first radio signal is QCLed with one antenna port in the K2 target antenna port group(s), and the K2 is a positive integer.

Embodiment 6

Figure 6:
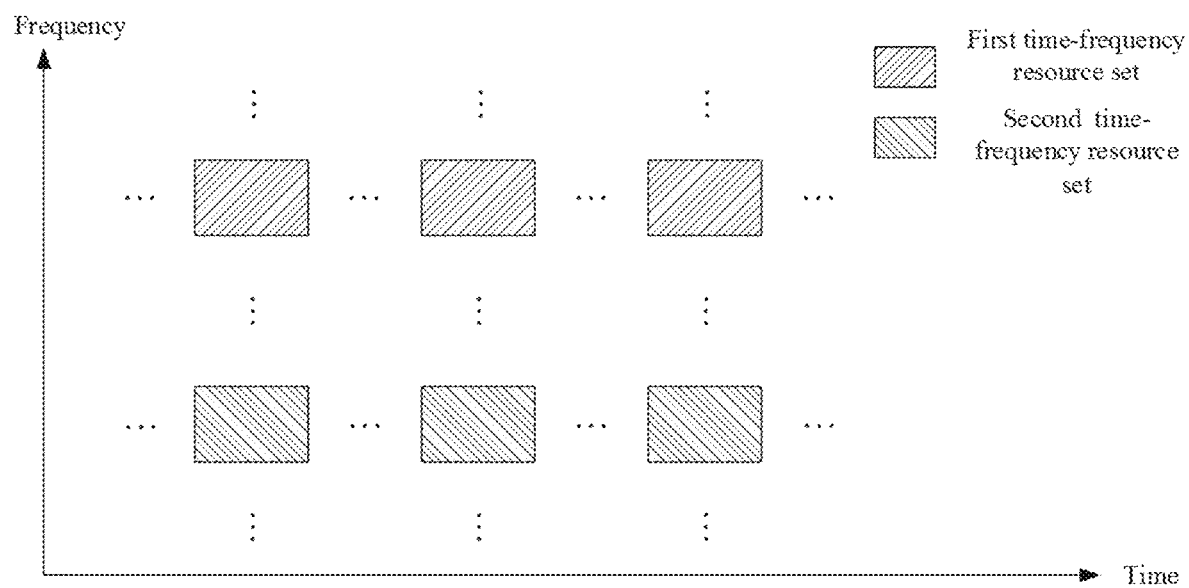
FIG. 6 is a diagram illustrating resources mapping of time-frequency resources in a first time-frequency resource set and a second time-frequency resource set in time-frequency domain according to one embodiment of the disclosure.

Embodiment 6 illustrates a diagram of time-frequency resources in a first time-frequency resource set and a second time-frequency resource set in time-frequency domain, as shown in FIG. 6.

In Embodiment 6, the first time-frequency resource set and the second time-frequency resource set include a positive integer number of time-frequency resource(s) respectively, one time-frequency resource includes a positive integer number of multicarrier symbol(s) in time domain and includes a positive integer number of subcarrier(s) in frequency domain. In FIG. 6, boxes filled with left slashes represent the first time-frequency resource set, and boxes filled with right slashes represent the second time-frequency resource set.

In one embodiment, one time-frequency resource includes a positive integer number of consecutive multicarrier symbol(s) in time domain.

In one embodiment, one time-frequency resource includes a positive integer number of inconsecutive multicarrier symbol(s) in time domain.

In one embodiment, one time-frequency resource includes a positive integer number of consecutive subcarrier(s) in frequency domain.

In one embodiment, one time-frequency resource includes a positive integer number of inconsecutive subcarrier(s) in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol includes a Cyclic Prefix (CP).

In one embodiment, the first time-frequency resource set includes multiple time-frequency resources.

In one embodiment, the second time-frequency resource set includes multiple time-frequency resources.

In one embodiment, any two time-frequency resources in the first time-frequency resource set are orthogonal (non-overlapping) in time-frequency domain.

In one embodiment, any two time-frequency resources in the second time-frequency resource set are orthogonal (non-overlapping) in time-frequency domain.

In one embodiment, any one time-frequency resource in the first time-frequency resource set and any one time-frequency resource in the second time-frequency resource set are orthogonal (non-overlapping) in time-frequency domain.

In one embodiment, no time-frequency resource belongs to the first time-frequency resource set and the second time-frequency resource set simultaneously.

In one embodiment, no Resource Element (RE) belongs to the first time-frequency resource set and the second time-frequency resource set simultaneously.

In one embodiment, one RE occupies one multicarrier symbol in time domain and one subcarrier in frequency domain.

In one embodiment, at least two of the time-frequency resources included in the first time-frequency resource set are not consecutive in time domain.

In one embodiment, at least two of the time-frequency resources included in the second time-frequency resource set are not consecutive in time domain.

In one embodiment, the first time-frequency resource set includes one CORESET.

In one embodiment, the first time-frequency resource set includes multiple CORESETs.

In one embodiment, the first time-frequency resource set includes one dedicated CORESET.

In one embodiment, the first time-frequency resource set includes multiple dedicated CORESETs.

In one embodiment, the first time-frequency resource set includes one Searchspace.

In one embodiment, the first time-frequency resource set includes multiple Searchspaces.

In one embodiment, the first time-frequency resource set includes one dedicated
Searchspace.

In one embodiment, the first time-frequency resource set includes multiple dedicated Searchspaces.

In one embodiment, at least two time-frequency resources in the first time-frequency resource set belong to one same CORESET.

In one embodiment, at least two time-frequency resources in the first time-frequency resource set belong to one same dedicated CORESET.

In one embodiment, at least two time-frequency resources in the first time-frequency resource set belong to one same Searchspace.

In one embodiment, at least two time-frequency resources in the first time-frequency resource set belong to one same dedicated Searchspace.

In one embodiment, at least two time-frequency resources in the first time-frequency resource set belong to different CORESETs.

In one embodiment, at least two time-frequency resources in the first time-frequency resource set belong to different dedicated CORESETs.

In one embodiment, at least two time-frequency resources in the first time-frequency resource set belong to different Searchspaces.

In one embodiment, at least two time-frequency resources in the first time-frequency resource set belong to different dedicated Searchspaces.

In one embodiment, the second time-frequency resource set includes one CORESET.

In one embodiment, the second time-frequency resource set includes multiple CORESETs.

In one embodiment, the second time-frequency resource set includes one dedicated CORESET.

In one embodiment, the second time-frequency resource set includes multiple dedicated CORESETs.

In one embodiment, the second time-frequency resource set includes one Searchspace.

In one embodiment, the second time-frequency resource set includes multiple Searchspaces.

In one embodiment, the second time-frequency resource set includes one dedicated Searchspace.

In one embodiment, the second time-frequency resource set includes multiple dedicated Searchspaces.

In one embodiment, at least two time-frequency resources in the second time-frequency resource set belong to one same CORESET.

In one embodiment, at least two time-frequency resources in the second time-frequency resource set belong to one same dedicated CORESET.

In one embodiment, at least two time-frequency resources in the second time-frequency resource set belong to one same Searchspace.

In one embodiment, at least two time-frequency resources in the second time-frequency resource set belong to one same dedicated Searchspace.

In one embodiment, at least two time-frequency resources in the second time-frequency resource set belong to different CORESETs.

In one embodiment, at least two time-frequency resources in the second time-frequency resource set belong to different dedicated CORESETs.

In one embodiment, at least two time-frequency resources in the second time-frequency resource set belong to different Searchspaces.

In one embodiment, at least two time-frequency resources in the second time-frequency resource set belong to different dedicated Searchspaces.

Embodiment 7

Figure 7:
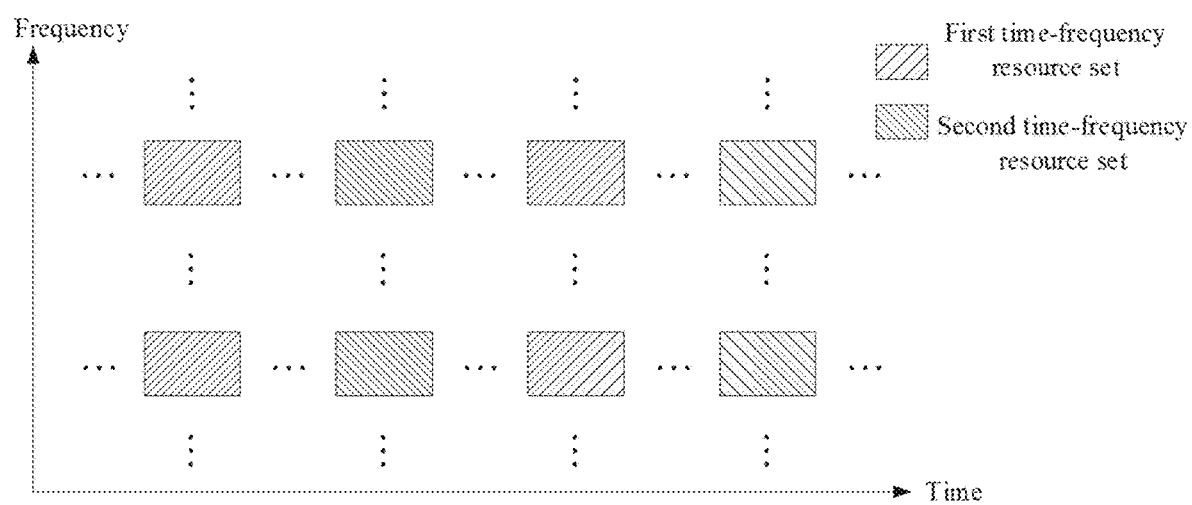
FIG. 7 is a diagram illustrating resources mapping of time-frequency resources in a first time-frequency resource set and a second time-frequency resource set in time-frequency domain according to one embodiment of the disclosure.

Embodiment 7 illustrates a diagram of time-frequency resources in a first time-frequency resource set and a second time-frequency resource set in time-frequency domain, as shown in FIG. 7.

In Embodiment 7, the first time-frequency resource set and the second time-frequency resource set include a positive integer number of time-frequency resource(s) respectively, one time-frequency resource includes a positive integer number of multicarrier symbol(s) in time domain and includes a positive integer number of subcarrier(s) in frequency domain. In FIG. 7, boxes filled with left slashes represent the first time-frequency resource set, and boxes filled with right slashes represent the second time-frequency resource set.

In one embodiment, at least two of the time-frequency resources included in the first time-frequency resource set are not consecutive in frequency domain.

In one embodiment, at least two of the time-frequency resources included in the second time-frequency resource set are not consecutive in frequency domain.

Embodiment 8

Figure 8:
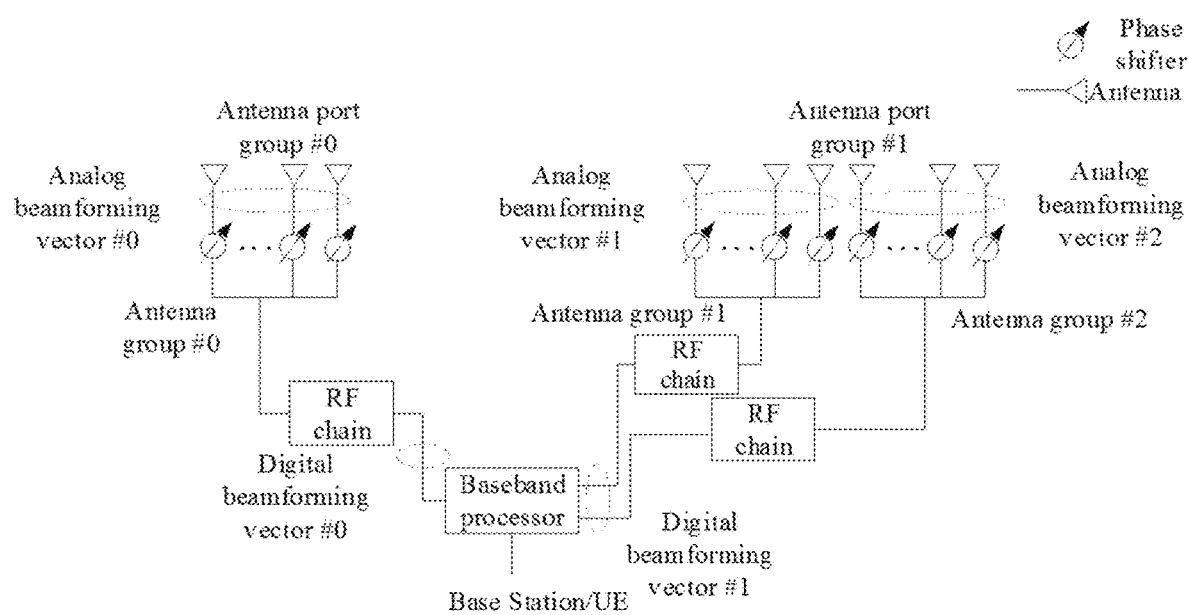
FIG. 8 is a diagram illustrating an antenna port and an antenna port group according to one embodiment of the disclosure.

Embodiment 8 illustrates a diagram of an antenna port and an antenna port group, as shown in FIG. 8.

In Embodiment 8, one antenna port group includes a positive integer number of antenna port(s); one antenna port is formed by antennas in a positive integer number of antenna group(s) through antenna virtualization superposition; one antenna group includes a positive integer number of antenna(s). One antenna group is connected to a baseband processor through one Radio Frequency (RF) chain, and different antenna groups correspond to different RF chains. Mapping coefficients from all antennas in a positive integer number of antenna group(s) included in a given antenna port to the given antenna port constitute a beamforming vector corresponding to the given antenna port. Mapping coefficients from multiple antennas included in any one given antenna group among a positive integer number of antenna group(s) included in the given antenna port to the given antenna port constitute an analog beamforming vector of the given antenna group. Analog beamforming vectors corresponding to the positive integer number of antenna groups included in the given antenna port are diagonally arranged to form an analog beamforming matrix corresponding to the given antenna port. Mapping coefficients from the positive integer number of antenna groups included in the given antenna port to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 8 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna group, that is, one RF chain, for example, the antenna port group #0 in FIG. 8.

In one subembodiment, an analog beamforming matrix corresponding to the antenna port in the one antenna port group is dimensionally reduced to an analog beamforming vector, a digital beamforming vector corresponding to the antenna port in the one antenna port group is dimensionally reduced to one scalar, and a beamforming vector corresponding to the antenna port in the one antenna port group is equal to its corresponding analog beamforming vector. For example, the antenna port group #0 in FIG. 8 includes the antenna group #0, the digital beamforming vector #0 in FIG. 8 is dimensionally reduced to one scalar, and the beamforming vector corresponding to the antenna port in the antenna port group #0 is the analog beamforming vector #0.

In one subembodiment, the one antenna port group includes one antenna port.

In one embodiment, one antenna port group includes multiple antenna groups, that is, multiple RF chains, for example, the antenna port group #1 in FIG. 8.

In one subembodiment, the one antenna port group includes multiple antenna ports.

In one subembodiment, different antenna ports in the one antenna port group correspond to a same analog beamforming matrix.

In one subembodiment, different antenna ports in the one antenna port group correspond to different digital beamforming vectors.

In one embodiment, antenna ports in different antenna port groups correspond to different analog beamforming matrixes.

In one embodiment, any two antenna ports in one antenna port group are QCLed.

In one embodiment, any two antenna ports in one antenna port group are QCLed.

In one embodiment, any two antenna ports in one antenna port group are spatially QCLed.

In one embodiment, the antenna port is an antenna port.

In one embodiment, small-scale channel parameters experienced by one radio signal transmitted on one antenna port can be deduced from small-scale channel parameters experienced by another radio signal transmitted on the antenna port.

In one subembodiment, the small-scale channel parameter includes one or more of a Channel Impulse Response (CIR), a Precoding Matrix Indicator (PMI), a Channel Quality Indicator (CQI) or a Rank Indicator (RI).

In one embodiment, the phrase that two antenna ports are QCLed refers that the two antenna ports are Quasi Co-Located.

In one embodiment, the phrase that two antenna ports are QCLed refers that the two antenna ports are spatially QCLed In one embodiment, the phrase that two antenna ports are QCLed refers that: full or partial large-scale properties of a radio signal transmitted on one of the two antenna ports can be deduced from full or partial large-scale properties of a radio signal transmitted on the other one of the two antenna ports, and the large-scale properties include multiantenna related large-scale properties and multiantenna unrelated large-scale properties.

In one embodiment, a multiantenna related large-scale property of a given radio signal includes one or more of an angle of arrival, an angle of departure, a spatial correlation, a spatial TX parameter or a spatial Rx parameter.

In one embodiment, the spatial Tx parameter includes one or more of an antenna port, an antenna port group, a transmitting beam, a transmitting analog beamforming matrix, a transmitting analog beamforming vector, a transmitting beamforming vector or transmitting spatial filtering.

In one embodiment, the spatial Rx parameter includes one or more of a receiving beam, a receiving analog beamforming matrix, a receiving analog beamforming vector, a receiving beamforming vector or receiving spatial filtering.

In one embodiment, a multiantenna unrelated large-scale property of a given radio signal includes one or more of a delay spread, a Doppler spread, a Doppler shift, a path loss, an average gain or an average delay.

In one embodiment, the phrase that two antenna ports are QCLed refers that: the two antenna ports have at least one same QCL parameter, and the QCL parameter includes a multiantenna related QCL parameter and a multiantenna unrelated QCL parameter.

In one embodiment, a multiantenna related QCL parameter includes one or more of an angle of arrival, an angle of departure, a spatial correlation, a spatial TX parameter or a spatial Rx parameter.

In one embodiment, a multiantenna unrelated QCL parameter includes one or more of a delay spread, a Doppler spread, a Doppler shift, a path loss or an average gain.

In one embodiment, the phrase that two antenna ports are QCLed refers that: at least one QCL parameter of one of the two antenna ports can be deduced from at least one QCL parameter of the other one of the two antenna ports.

In one embodiment, the phrase that two antenna ports are spatially QCLed refers that: full or partial multiantenna related large-scale properties of a radio signal transmitted on one of the two antenna ports can be deduced from full or partial multiantenna related large-scale properties of a radio signal transmitted on the other one of the two antenna ports.

In one embodiment, the phrase that two antenna ports are spatially QCLed refers that: the two antenna ports have at least one same multiantenna related QCL parameter (spatial QCL parameter).

In one embodiment, the phrase that two antenna ports are QCLed refers that: at least one multiantenna related QCL parameter of one of the two antenna ports can be deduced from at least one multiantenna related QCL parameter of the other one of the two antenna ports.

Embodiment 9

Figure 9:
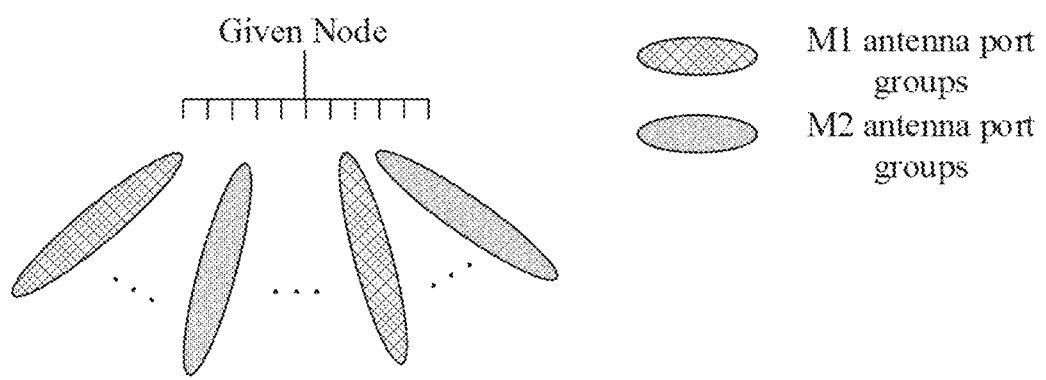
FIG. 9 is a diagram illustrating M1 antenna port groups and M2 antenna port groups according to one embodiment of the disclosure.

Embodiment 9 illustrates a diagram of M1 antenna port groups and M2 antenna port groups, as shown in FIG. 9.

In Embodiment 9, one antenna port group includes a positive integer number of antenna ports. The M1 antenna port groups and the M2 antenna port groups are both formed by antennas configured by a given node, and the given node refers to the UE in the disclosure or the base station in the disclosure. In FIG. 9, an ellipse filled with cross lines represents an antenna port group in the M1 antenna port groups, and an ellipse filled with dots represents an antenna port group in the M2 antenna port groups.

In one embodiment, any two antenna ports in any one of the M1 antenna port groups are QCLed.

In one embodiment, any two antenna ports in any one of the M2 antenna port groups are QCLed.

In one embodiment, any one antenna port in the M1 antenna port groups is not QCLed with any one antenna port in the M2 antenna port groups.

In one embodiment, the phrase that a first antenna port is not QCLed with a second antenna port refers that: the first antenna port and the second antenna port are any one antenna port in any two of the M1 antenna port groups respectively.

In one embodiment, the phrase that a third antenna port is not QCLed with a fourth antenna port refers that: the third antenna port and the fourth antenna port are any one antenna port in any two of the M2 antenna port groups respectively.

Embodiment 10

Figure 10:
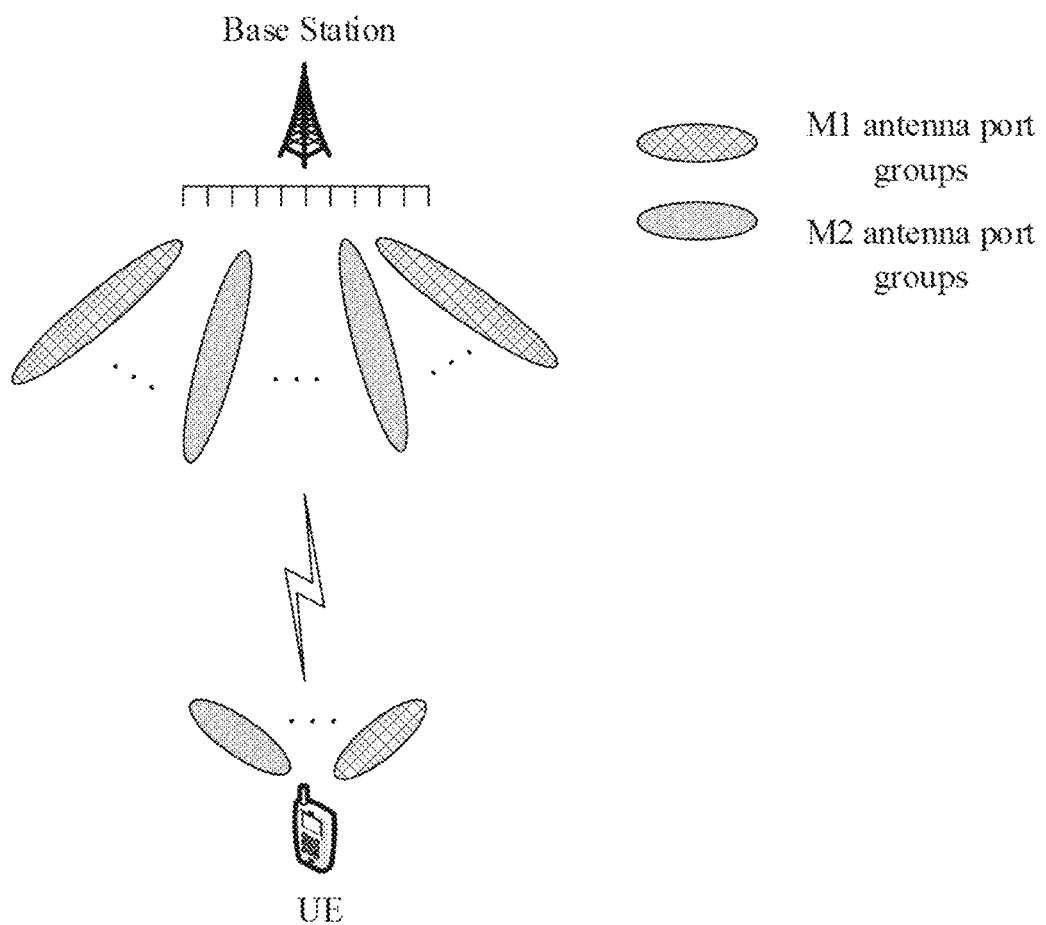
FIG. 10 is a diagram illustrating M1 antenna port groups and M2 antenna port groups according to one embodiment of the disclosure.

Embodiment 10 illustrates a diagram of M1 antenna port groups and M2 antenna port groups, as shown in FIG. 10.

In Embodiment 10, one antenna port group includes a positive integer number of antenna ports. Some antenna port groups in the M1 antenna port groups are formed by antennas configured by the base station in the disclosure, and the other antenna port groups in the M1 antenna port groups are formed by antennas configured by the UE in the disclosure. Some antenna port groups in the M2 antenna port groups are formed by antennas configured by the base station in the disclosure, and the other antenna port groups in the M2 antenna port groups are formed by antennas configured by the UE in the disclosure. In FIG. 10, an ellipse filled with cross lines represents an antenna port group in the M1 antenna port groups, and an ellipse filled with dots represents an antenna port group in the M2 antenna port groups.

Embodiment 11

Figure 11:
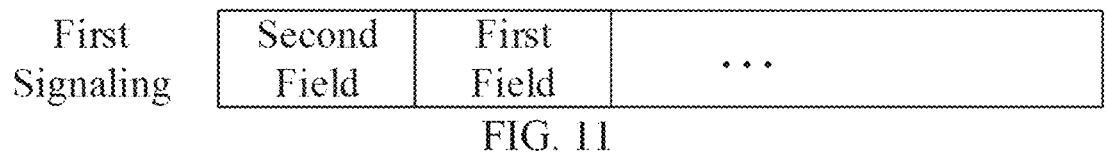
FIG. 11 is a diagram illustrating a first signaling according to one embodiment of the disclosure.

Embodiment 11 illustrates a diagram of a first signaling, as shown in FIG. 11.

In Embodiment 11, the scheduling information of the first radio signal in the disclosure is codebook-based, and the first signaling includes a first field and a second field. The first field is used for determining K1 codeword(s) from a first codebook, and the K1 codeword(s) is(are) used for determining a transmitting antenna port(s) of the first radio signal in the disclosure; the first codebook includes a positive integer number of codewords; and the K1 is a positive integer. The second field is used for determining K2 target antenna port group(s), any one transmitting antenna port of the first radio signal is QCLed with one antenna port in the K2 target antenna port group(s), and the K2 is a positive integer. The first radio signal includes K3 sub-signal(s), the K3 sub-signal(s) is(are) transmitted by K3 antenna port(s) respectively, and the K3 is a positive integer not less than the K1 and the K2

In one embodiment, the first field includes a Transmitted Precoding Matrix Indicator (TPMI).

In one subembodiment, the specific definition of the TPMI can refer to Chapter 5.3.3 in 3GPP TS36.212.

In one embodiment, the first field includes K1 TPMIs.

In one embodiment, the first field is a Precodinginformation field.

In one subembodiment, the specific definition of the Precodinginformation field can refer to Chapter 5.3.3 in 3GPP TS36.212.

In one embodiment, the first field is a Precoding information and number of layers field.

In one subembodiment, the specific definition of the Precoding information and number of layers field can refer to Chapter 5.3.3 in 3GPP TS36.212.

In one embodiment, the first field is a TPMI information for precoding field.

In one subembodiment, the specific definition of the TPMI information for precoding field can refer to Chapter 5.3.3 in 3GPP TS36.212.

In one embodiment, the first field is used for determining an index of each of the K1 codeword(s) in the first codebook.

In one embodiment, the first field indicates explicitly an index of each of the K1 codeword(s) in the first codebook.

In one embodiment, the first field indicates implicitly an index of each of the K1 codeword(s) in the first codebook.

In one embodiment, the first field is used for determining the K3.

In one embodiment, the first field indicates explicitly the K3.

In one embodiment, the first field indicates implicitly the K3.

In one embodiment, the first field includes a positive integer number of bit(s).

In one embodiment, the first field includes 2 bits.
In one embodiment, the first field includes 3 bits.
In one embodiment, the first field includes 4 bits.
In one embodiment, the first field includes 5 bits.
In one embodiment, the first field includes 6 bits.

In one embodiment, the second field includes a Sounding reference signal ResourceIndicator (SRI).

In one embodiment, the second field includes K2 SRIs.

In one embodiment, the second field includes a Channel-state information reference signals Resource Indicator (CRI).

In one embodiment, the second field includes K2 CRIs.

In one embodiment, the second field includes a TransmissionConfigurationIndication (TCI).

In one embodiment, the second field includes K2 TCIs.

In one embodiment, the second field is a Sounding Reference Signal (SRS) resource indicator field.

In one subembodiment, the specific definition of the SRSresource indicator field can refer to Chapter 7.3.1 in 3GPPTS38.212.

In one embodiment, the second field is a Transmission configuration indication field.

In one subembodiment, the specific definition of the Transmission configuration indication field can refer to Chapter 7.3.1 in 3GPPTS38.212.

In one embodiment, the second field is used for determining the K2.

In one embodiment, the second field indicates explicitly the K2.

In one embodiment, the second field indicates implicitly the K2.

In one embodiment, the K2 target antenna port group(s) is(are) a subset of S candidate antenna port group(s), and the second field is used for determining an index of each of the K2 target antenna port group(s) in the S candidate antenna port group(s). the S is a positive integer number not less than the K2.

In one embodiment, the K2 target antenna port group(s) is(are) a subset of S candidate antenna port group(s), and the second field indicates explicitly an index of each of the K2 target antenna port group(s) in the S candidate antenna port group(s). the S is a positive integer number not less than the K2.

In one embodiment, the K2 target antenna port group(s) is(are) a subset of S candidate antenna port group(s), and the second field indicates implicitly an index of each of the K2 target antenna port group(s) in the S candidate antenna port group(s). the S is a positive integer number not less than the K2.

In one embodiment, the S is equal to $N_{SRS}$, and the specific definition of the $N_{SRS}$ can refer to Chapter 7.3.1 in 3GPPTS38.212.

In one embodiment, the second field includes 1 bit.
In one embodiment, the second field includes 2 bits.
In one embodiment, the second field includes 3 bits.
In one embodiment, the second field includes 4 bits.
In one embodiment, the second field includes 5 bits.
In one embodiment, the second field includes 6 bits.

In one embodiment, a number of bits included in the second field is equal to $\lceil \log_2(N_{SRS}) \rceil$, where $N_{SRS}$ is a number of configured SRS resources. The specific definition of the $N_{SRS}$ can refer to Chapter 7.3.1 in 3GPPTS38.212.

In one embodiment, the K1 is equal to 1.
In one embodiment, the K1 is greater than 1.
In one embodiment, the K2 is equal to 1.
In one embodiment, the K2 is greater than 1.
In one embodiment, the K3 is equal to the K1.
In one embodiment, the K3 is greater than the K1.
In one embodiment, the K3 is equal to the K2.
In one embodiment, the K3 is greater than the K2.

In one embodiment, any one of the K2 target antenna port group(s) includes one antenna port.

In one embodiment, at least one of the K2 target antenna port group(s) includes multiple antenna ports.

In one embodiment, any one of the K2 target antenna port group(s) includes multiple antenna ports.

In one embodiment, any two antenna ports in any one of the K2 target antenna port group(s) are QCLed.

In one embodiment, any one antenna port in a first target antenna port group is not QCLed with any one antenna port in a second target antenna port group, the first target antenna port group and the second target antenna port group are any two of the K2 target antenna port group(s).

In one embodiment, any one antenna port in a first target antenna port group and any one antenna port in a second target antenna port group cannot be assumed to be QCLed, the first target antenna port group and the second target antenna port group are any two of the K2 target antenna port group(s).

In one embodiment, any two of the K3 antenna ports are QCLed.

In one embodiment, any two of the K3 antenna ports cannot be assumed to be QCLed.

In one embodiment, at least two of the K3 antenna ports are not QCLed.

In one embodiment, at least two of the K3 antenna ports cannot be assumed to be QCLed.

In one embodiment, the K3 is a number of layers, and the specific definition of the number of layers can refer to Chapter 7.3.1 in 3GPPTS38.212.

In one embodiment, the K3 sub-signals occupy same time-frequency resources.

In one embodiment, the K1 codeword(s) is(are) used for determining the K3 antenna port(s) respectively.

In one embodiment, the K1 codeword(s) is(are) used for determining K3 vector(s) respectively.

In one subembodiment, the K3 vector(s) is(are) used for determining the K3 antenna port(s) respectively.

In one subembodiment, the K3 vector(s) is(are) a digital beamforming vector(s) corresponding to the K3 antenna port(s) respectively.

In one embodiment, the K1 codeword(s) is(are) used for determining K1 code matrix(es) respectively, the K1 code matrix(es) totally include(s) K3 column vector(s), and the K3 column vector(s) is(are) used for determining K3 vector(s) respectively.

In one subembodiment, the K3 vector(s) is(are) used for determining the K3 antenna port(s) respectively.

In one subembodiment, the K3 vector(s) is(are) a digital beamforming vector(s) corresponding to the K3 antenna port(s) respectively.

In one subembodiment, the K3 column vector(s) is(are) equal to the K3 vector(s) respectively.

In one subembodiment, a number of column vectors included in at least one of the K1 code matrix(es) is 1.

In one subembodiment, a number of column vectors included in at least one of the K1 code matrix(es) greater than 1.

In one embodiment, the first radio signal includes K3 first reference signal(s), and the K3 first reference signal(s) is(are) transmitted by K3 antenna port(s) respectively.

In one subembodiment, the K3 first reference signal(s) include(s) a DMRS respectively.

In one subembodiment, any two of the K3 first reference signals occupy orthogonal time-frequency resources.

In one subembodiment, at least two of the K3 first reference signals occupy same time-frequency resources and orthogonal code domain resources.

In one subembodiment, any two of the K3 first reference signals occupy same time-frequency resources and orthogonal code domain resources.

In one embodiment, the K3 sub-signal(s) is(are) divided into K2 sub-signal group(s), each of the K2 sub-signal group(s) includes a positive integer number of sub-signal(s) among the K3 sub-signal(s), and the K2 sub-signal group(s) are one-to-one corresponding to the K2 target antenna port group(s).

In one subembodiment, transmitting antenna ports of any two sub-signals in any one of the K2 sub-signal group(s) are QCLed.

In one subembodiment, transmitting antenna ports of any two sub-signals in any one of the K2 sub-signal group(s) correspond to a same analog beamforming matrix.

In one subembodiment, a transmitting antenna port of any one sub-signal in a first sub-signal group is not QCLed with a transmitting antenna port of any one sub-signal in a second sub-signal group; the first sub-signal group and the second sub-signal group are any two of the K2 sub-signal groups.

In one subembodiment, a transmitting antenna port of any one sub-signal in any one of the K2 sub-signal group(s) is QCLed with one antenna port in a corresponding target antenna port group.

In one subembodiment, a transmitting antenna port of any one sub-signal in any one of the K2 sub-signal group(s) is QCLed with any one antenna port in a corresponding target antenna port group.

In one subembodiment, any one of the K2 target antenna port group(s) is used for determining beamforming vectors corresponding to transmitting antenna ports of all sub-signals in a corresponding sub-signal group.

In one subembodiment, any one of the K2 target antenna port group(s) is used for determining an analog beamforming matrix corresponding to transmitting antenna ports of all sub-signals in a corresponding sub-signal group.

In one subembodiment, an analog beamforming matrix corresponding to any one of the K2 target antenna port group(s) is equal to an analog beamforming matrix corresponding to transmitting antenna ports of all sub-signals in a corresponding sub-signal group.

In one subembodiment, the K1 is equal to the K2, the K1 is used for determining K1 code matrix(es) respectively, the K1 code matrix(es) is(are) one-to-one corresponding to the K2 sub-signal group(s). A number of column vectors included in any one given code matrix among the K1 code matrix(es) is equal to a number of sub-signals included in a corresponding sub-signal group. Column vectors included in the given code matrix are used for determining digital beamforming vectors of transmitting antenna ports of sub-signals included in a corresponding sub-signal group.

In one reference embodiment of the above subembodiment, column vectors included in the given code matrix are equal to digital beamforming vectors of transmitting antenna ports of sub-signals included in a corresponding sub-signal group respectively.

Embodiment 12

Figure 12:
FIG. 12 is a diagram illustrating a first signaling according to one embodiment of the disclosure.

Embodiment 12 illustrates a diagram of a first signaling, as shown in FIG. 12.

In Embodiment 12, the scheduling information of the first radio signal in the disclosure is codebook-based; the first signaling includes a second field, the second field is used for determining K2 target antenna port group(s), and the K2 is a positive integer; the first radio signal includes K2 sub-signal(s), the K2 sub-signal(s) is(are) transmitted by K2 antenna port(s) respectively, the K2 antenna port(s) is(are) one-to-one corresponding to the K2 target antenna port(s); any one of the K2 antenna port(s) is QCLed with one antenna port in a corresponding target antenna port group.

In one embodiment, the first signaling does not include the first field in the disclosure.

In one embodiment, any one of the K2 antenna port(s) is QCLed with one antenna port in a corresponding target antenna port group.

In one embodiment, a number of bits included in the second field is equal to $$\left\lceil \log_2\left(\sum_{k=1}^{L_{max}} \binom{N_{SRS}}{k}\right)\right\rceil,$$

where $N_{SRS}$ is a number of configured SRS resources, and the $L_{max}$ is a maximum layer number that the UE can support on a PUSCH. The specific definitions of the $N_{SRS}$ and the $L_{max}$ can refer to Chapter 7.3.1 in 3GPPTS38.212.

In one embodiment, the K2 antenna port(s) is(are) one antenna port in the K2 target antenna port group(s) respectively.

In one embodiment, the K2 sub-signal(s) is(are) transmitted by an antenna port(s) in the K2 target antenna port group(s) respectively.

In one embodiment, any one of the K2 target antenna port group(s) include one antenna port.

In one embodiment, the K2 sub-signals occupy same time-frequency resources.

In one embodiment, the K2 is a number of layers, and the specific definition of the number of layers can refer to Chapter 7.3.1 in 3GPPTS38.212.

Embodiment 13

Figure 13:
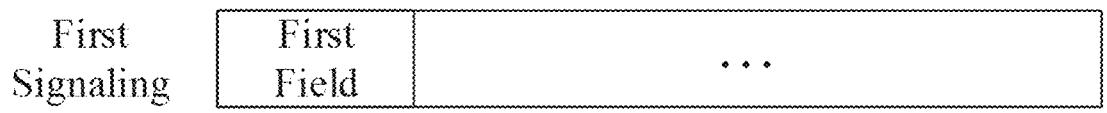
FIG. 13 is a diagram illustrating a first signaling according to one embodiment of the disclosure.

Embodiment 13 illustrates a diagram of a first signaling, as shown in FIG. 13.

In Embodiment 13, the scheduling information of the first radio signal in the disclosure is codebook-based; the first signaling includes a first field. The first field is used for determining K1 codeword(s) from a first codebook, and the K1 codeword(s) is(are) used for determining a transmitting antenna port(s) of the first radio signal in the disclosure; the first codebook includes a positive integer number of codewords; and the K1 is a positive integer. The first radio signal includes K3 sub-signal(s), the K3 sub-signal(s) is(are) transmitted by K3 antenna port(s) respectively, and the K3 is a positive integer not less than the K1.

In one embodiment, the K1 codeword(s) is(are) used for determining K3 vector(s) respectively, and the K3 vector(s) is(are) beamforming vector(s) corresponding to the K3 antenna port(s) respectively.

In one subembodiment, the K1 codeword(s) is(are) used for determining K1 code matrix(es) respectively, the K1 code matrix(es) totally include(s) K3 column vector(s), and the K3 column vector(s) is(are) used for determining K3 vector(s) respectively.

In one reference embodiment of the above subembodiment, the K3 column vector(s) is(are) equal to the K3 vector(s) respectively.

Embodiment 14

Figure 14:
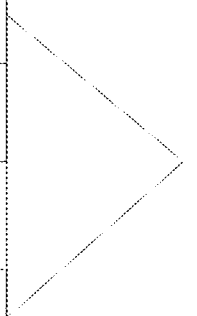
FIG. 14 is a diagram illustrating a first codebook according to one embodiment of the disclosure.

Embodiment 14 illustrates a diagram of a first codebook, as shown in FIG. 14.

Figure 15:
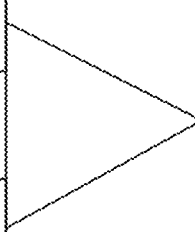
FIG. 15 is a diagram illustrating a first codebook according to one embodiment of the disclosure.

In Embodiment 14, the first codebook includes a positive integer number of codewords; the K1 codewords in the disclosure all belong to the first codebook. In FIG. 14, the first codebook includes a positive integer number of rows and V+1 columns, and the V represents a maximum number of layers that can be supported on a PUSCH; each row represents one index and V codewords; a first column represents indexes of codewords; a yth column represents codewords corresponding to a layer number y−1, and the y is a positive integer greater than 1 but not greater than V+1. In FIG. 15, indexes of codewords in the first codebook are {#0, #1, . . . , #x, . . . } respectively, where the x is a positive integer greater than 1; when an index is x in the first codebook, a codeword corresponding to a layer y−1 is expressed as a codeword #(x, y−1).

In one embodiment, the first codebook is one codebook.

In one subembodiment, the specific definition of the codebook can refer to Chapter 6.3.4 in 3GPPTS36.211.

In one embodiment, the first codebook includes a positive integer number of vectors.

In one embodiment, any one of the K1 codewords is one vector.

In one embodiment, the first codebook includes a positive integer number of matrixes.

In one embodiment, any one of the K1 codewords is one matrix.

In one embodiment, at least one codeword in the first codebook is one vector.

In one embodiment, at least one of the K1 codewords is one vector.

In one embodiment, at least one codeword in the first codebook is one matrix.

In one embodiment, at least one of the K1 codewords is one matrix.

In one embodiment, the first codebook is preconfigured.

In one embodiment, the first codebook is configured by a high layer signaling.

In one embodiment, the first codebook is configured by a higher layer signaling.

In one embodiment, the first codebook is configured by an RRC signaling.

In one embodiment, the first codebook is predefined.

In one embodiment, the first codebook is UE specific.

In one embodiment, the V is $L_{max}$, and the specific definition of the $L_{max}$ can refer to Chapter 7.3.1 in 3GPPTS38.212.

Embodiment 15

Embodiment 15 illustrates a diagram of a first codebook, as shown in FIG. 15.

In Embodiment 15, the first codebook includes a positive integer number of codewords; the K1 codewords in the disclosure all belong to the first codebook. In FIG. 15, the first codebook includes a positive integer number of rows and two columns, and each row represents one index and one codeword; a first column represents indexes of codewords; a second column represents a codeword corresponding to each row. In FIG. 15, indexes of the positive integer number of codewords included in the first codebook are {#0, #1, . . . , #x, . . . } respectively, where the x is a positive integer greater than 1.

Embodiment 16

Figure 16:
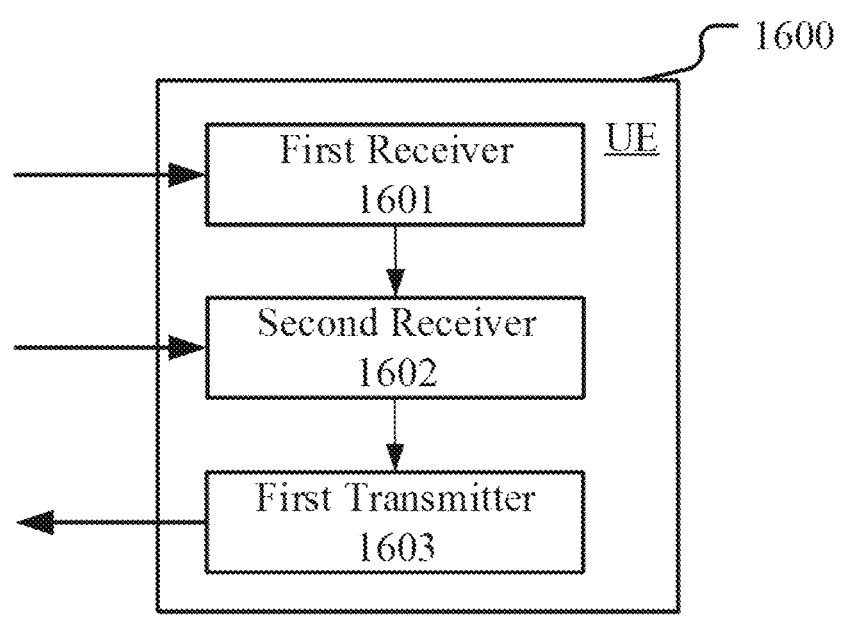
FIG. 16 is a structure block diagram illustrating a processing device in a UE according to one embodiment of the disclosure.

Embodiment 16 illustrates a structure block diagram of a processing device in a UE, as shown in FIG. 16.

In FIG. 16, the processing device 1600 in the UE mainly includes a first receiver 1601, a second receiver 1602 and a first transmitter 1603.

In Embodiment 16, the first receiver 1601 receives first information; the second receiver 1602 receives a first signaling; and the first transmitter 1603 transmits a first radio signal.

In Embodiment 16, the first information is used by the first transmitter 1603 to determine a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

In one embodiment, the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

In one embodiment, the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s).

In one embodiment, the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

In one embodiment, when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

In one embodiment, the first signaling includes a second field, the second field is used for determining K2 target antenna port group(s), any one transmitting antenna port of the first radio signal is QCLed with one antenna port in the K2 target antenna port group(s), and the K2 is a positive integer.

In one embodiment, the first receiver 1601 includes at least one of the antenna 452, the receiver 454, the receiving processor 456, the multiantenna receiving processor 458, the controller/processor 459, the memory 460 or the data source 467 illustrated in Embodiment 4.

In one embodiment, the second receiver 1601 includes at least one of the antenna 452, the receiver 454, the receiving processor 456, the multiantenna receiving processor 458, the controller/processor 459, the memory 460 or the data source 467 illustrated in Embodiment 4.

In one embodiment, the first transmitter 1603 includes at least one of the antenna 452, the transmitter 454, the transmitting processor 468, the multiantenna transmitting processor 457, the controller/processor 459, the memory 460 or the data source 467 illustrated in Embodiment 4.

Embodiment 17

Figure 17:
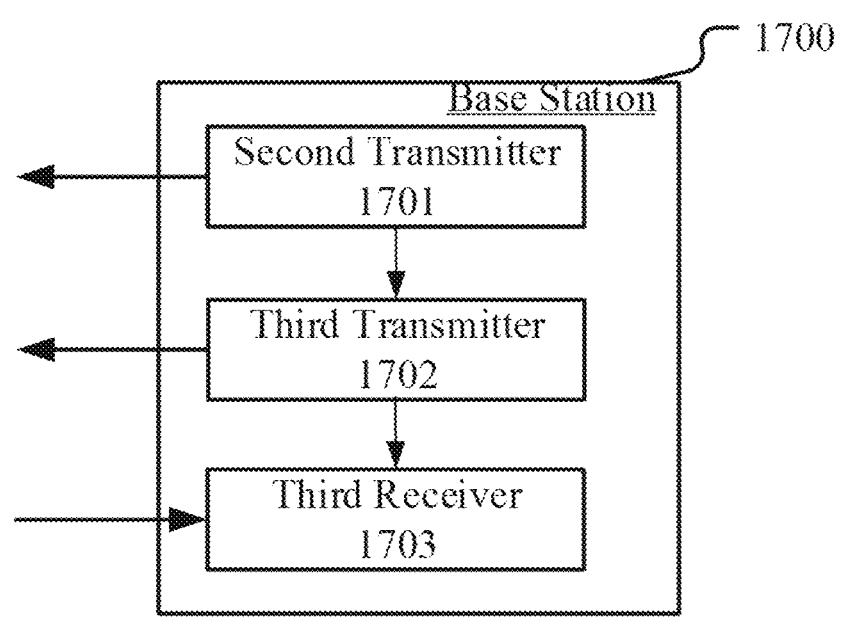
FIG. 17 is a structure block diagram illustrating a processing device in a base station according to one embodiment of the disclosure.

Embodiment 17 illustrates a structure block diagram of a processing device in a base station, as shown in FIG. 17. In FIG. 17, the processing device 1700 in the base station mainly includes a second transmitter 1701, a third transmitter 1702 and a third receiver 1703.

In Embodiment 17, the second transmitter 1701 transmits first information; the third transmitter 1702 transmits a first signaling; and the third receiver 1703 receives a first radio signal.

In Embodiment 17, the first information is used for determining a first air interface resource and a second air interface resource, and the first signaling includes scheduling information of the first radio signal; in instances in which the first radio signal is related to the first air interface resource, the scheduling information of the first radio signal is codebook-based; in instances in which the first radio signal is related to the second air interface resource, the scheduling information of the first radio signal is non-codebook-based; the first air interface resource includes at least one of M1 antenna port group(s) and a first time-frequency resource set, and the second air interface resource includes at least one of M2 antenna port group(s) and a second time-frequency resource set; one antenna port group includes a positive integer number of antenna port(s), one time-frequency resource set includes a positive integer number of time-frequency resource(s), the M1 and the M2 are positive integers respectively.

In one embodiment, the first air interface resource and the second air interface resource include the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set.

In one embodiment, the first air interface resource and the second air interface resource include the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

In one embodiment, the first air interface resource and the second air interface resource include the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s).

In one embodiment, the first air interface resource and the second air interface resource include the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

In one embodiment, when the scheduling information of the first radio signal is codebook-based, the first signaling includes a first field; when the scheduling information of the first radio signal is non-codebook-based, the first signaling does not include a first field; the first field is used for determining K1 codeword(s) from a first codebook, and the K1 codeword(s) is(are) used for determining a transmitting antenna port(s) of the first radio signal; the first codebook includes a positive integer number of codewords; and the K1 is a positive integer.

In one embodiment, the first signaling includes a second field, the second field is used for determining K2 target antenna port group(s), any one transmitting antenna port of the first radio signal is QCLed with one antenna port in the K2 target antenna port group(s), and the K2 is a positive integer.

In one embodiment, the second transmitter 1701 includes at least one of the antenna 420, the transmitter 418, the transmitting processor 416, the multiantenna transmitting processor 471, the controller/processor 475 or the memory 476 illustrated in Embodiment 4.

In one embodiment, the third transmitter 1702 includes at least one of the antenna 420, the transmitter 418, the transmitting processor 416, the multiantenna transmitting processor 471, the controller/processor 475 or the memory 476 illustrated in Embodiment 4.

In one embodiment, the third receiver 1703 includes at least one of the antenna 420, the receiver 418, the receiving processor 470, the multiantenna receiving processor 472, the controller/processor 475 or the memory 476 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE, the terminal and the UE in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving first information;
receiving a first signaling; and
transmitting a first radio signal;
wherein the first information is used for determining a first air interface resource and a second air interface resource, and the first signaling comprises scheduling information of the first radio signal; in instances in which the first radio signal is related to the first air interface resource, the scheduling information of the first radio signal is based on codebook-based precoding; in instances in which the first radio signal is related to the second air interface resource, the scheduling information of the first radio signal is based on non-codebook-based precoding; the first air interface resource comprises at least one of M1 antenna port group(s) and a first time-frequency resource set, and the second air interface resource comprises at least one of M2 antenna port group(s) and a second time-frequency resource set; one antenna port group comprises a positive integer number of antenna port(s), one time-frequency resource set comprises a positive integer number of time-frequency resource(s), the M1 and the M2 are positive integers respectively.

2. The method according to claim 1, wherein the first air interface resource and the second air interface resource comprise the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set;

or, the first air interface resource and the second air interface resource comprise the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

3. The method according to claim 1, wherein the first air interface resource and the second air interface resource comprise the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);

or, the first air interface resource and the second air interface resource comprise the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

4. The method according to claim 1, wherein when the scheduling information of the first radio signal is based on codebook-based precoding, the first signaling comprises a first field; when the scheduling information of the first radio signal is based on non-codebook-based precoding, the first signaling does not comprise a first field; the first field is used for determining K1 codeword(s) from a first codebook, and the K1 codeword(s) is(are) used for determining a transmitting antenna port(s) of the first radio signal; the first codebook comprises a positive integer number of codewords; and the K1 is a positive integer.

5. The method according to claim 1, wherein whether the first radio signal is related to the first air interface resource or the second air interface resource is used to determine whether the scheduling information of the first radio signal is based on codebook-based precoding or based on non-codebook-based precoding.

6. A method in a base station for wireless communication, comprising:
    transmitting first information;
    transmitting a first signaling; and
    receiving a first radio signal;
    wherein the first information is used for determining a first air interface resource and a second air interface resource, and the first signaling comprises scheduling information of the first radio signal; in instances in which the first radio signal is related to the first air interface resource, the scheduling information of the first radio signal is based on codebook-based precoding; in instances in which the first radio signal is related to the second air interface resource, the scheduling information of the first radio signal is based on non-codebook-based precoding; the first air interface resource comprises at least one of M1 antenna port group(s) and a first time-frequency resource set, and the second air interface resource comprises at least one of M2 antenna port group(s) and a second time-frequency resource set; one antenna port group comprises a positive integer number of antenna port(s), one time-frequency resource set comprises a positive integer number of time-frequency resource(s), the M1 and the M2 are positive integers respectively.

7. The method according to claim 6, wherein the first air interface resource and the second air interface resource comprise the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set;

or, the first air interface resource and the second air interface resource comprise the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

8. The method according to claim 6, wherein the first air interface resource and the second air interface resource comprise the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);

or, the first air interface resource and the second air interface resource comprise the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

9. The method according to claim 6, wherein when the scheduling information of the first radio signal is based on codebook-based precoding, the first signaling comprises a first field; when the scheduling information of the first radio signal is based on non-codebook-based precoding, the first signaling does not comprise a first field; the first field is used for determining K1 codeword(s) from a first codebook, and the K1 codeword(s) is(are) used for determining a transmitting antenna port(s) of the first radio signal; the first codebook comprises a positive integer number of codewords; and the K1 is a positive integer.

10. The method according to claim 6, wherein whether the first radio signal is related to the first air interface resource or the second air interface resource is used to determine whether the scheduling information of the first radio signal is based on codebook-based precoding or based on non-codebook-based precoding.

11. A UE for wireless communication, comprising:
    a first receiver, to receive first information;
    a second receiver, to receive a first signaling; and
    a first transmitter, to transmit a first radio signal;
    wherein the first information is used for determining a first air interface resource and a second air interface resource, and the first signaling comprises scheduling information of the first radio signal; in instances in which the first radio signal is related to the first air interface resource, the scheduling information of the first radio signal is based on codebook-based precoding; in instances in which the first radio signal is related to the second air interface resource, the scheduling information of the first radio signal is based on non-codebook-based precoding; the first air interface resource comprises at least one of M1 antenna port group(s) and a first time-frequency resource set, and the second air interface resource comprises at least one of M2 antenna port group(s) and a second time-frequency resource set; one antenna port group comprises a positive integer number of antenna port(s), one time-frequency resource set comprises a positive integer number of time-frequency resource(s), the M1 and the M2 are positive integers respectively.

12. The UE according to claim 11, wherein the first air interface resource and the second air interface resource comprise the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set;
   or, the first air interface resource and the second air interface resource comprise the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

13. The UE according to claim 11, wherein the first air interface resource and the second air interface resource comprise the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);
   or, the first air interface resource and the second air interface resource comprise the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

14. The UE according to claim 11, wherein when the scheduling information of the first radio signal is based on codebook-based precoding, the first signaling comprises a first field; when the scheduling information of the first radio signal is based on non-codebook-based precoding, the first signaling does not comprise a first field; the first field is used for determining K1 codeword(s) from a first codebook, and the K1 codeword(s) is(are) used for determining a transmitting antenna port(s) of the first radio signal; the first codebook comprises a positive integer number of codewords; and the K1 is a positive integer.

15. The UE according to claim 11, wherein whether the first radio signal is related to the first air interface resource or the second air interface resource is used to determine whether the scheduling information of the first radio signal is based on codebook-based precoding or based on non-codebook-based precoding.

16. A base station for wireless communication, comprising:
   a second transmitter, to transmit first information;
   a third transmitter, to transmit a first signaling; and
   a third receiver, to a first radio signal;
   wherein the first information is used for determining a first air interface resource and a second air interface resource, and the first signaling comprises scheduling information of the first radio signal; in instances in which the first radio signal is related to the first air interface resource, the scheduling information of the first radio signal is based on codebook-based precoding; in instances in which the first radio signal is related to the second air interface resource, the scheduling information of the first radio signal is based on non-codebook-based precoding; the first air interface resource comprises at least one of M1 antenna port group(s) and a first time-frequency resource set, and the second air interface resource comprises at least one of M2 antenna port group(s) and a second time-frequency resource set; one antenna port group comprises a positive integer number of antenna port(s), one time-frequency resource set comprises a positive integer number of time-frequency resource(s), the M1 and the M2 are positive integers respectively.

17. The base station according to claim 16, wherein the first air interface resource and the second air interface resource comprise the first time-frequency resource set and the second time-frequency resource set respectively; when the first radio signal is related to the first air interface resource, time-frequency resources occupied by the first signaling belong to the first time-frequency resource set; and when the first radio signal is related to the second air interface resource, time-frequency resources occupied by the first signaling belong to the second time-frequency resource set;
   or, the first air interface resource and the second air interface resource comprise the first time-frequency resource set and the second time-frequency resource set respectively; when the first radio signal is related to the first air interface resource, time-frequency resources occupied by the first radio signal belong to the first time-frequency resource set; and when the first radio signal is related to the second air interface resource, time-frequency resources occupied by the first radio signal belong to the second time-frequency resource set.

18. The base station according to claim 16, wherein the first air interface resource and the second air interface resource comprise the M1 antenna port group(s) and the M2 antenna port group(s) respectively; when the first radio signal is related to the first air interface resource, at least one transmitting antenna port of the first signaling is QCLed with one antenna port in the M1 antenna port group(s); when the first radio signal is related to the second air interface resource, at least one transmitting antenna port of the first signaling is QCLed with one antenna port in the M2 antenna port group(s);

or, the first air interface resource and the second air interface resource comprise the M1 antenna port group(s) and the M2 antenna port group(s) respectively; when the first radio signal is related to the first air interface resource, at least one transmitting antenna port of the first radio signal is QCLed with one antenna port in the M1 antenna port group(s); when the first radio signal is related to the second air interface resource, at least one transmitting antenna port of the first radio signal is QCLed with one antenna port in the M2 antenna port group(s).

19. The base station according to claim 16, wherein when the scheduling information of the first radio signal is based on codebook-based precoding, the first signaling comprises a first field; when the scheduling information of the first radio signal is based on non-codebook-based precoding, the first signaling does not comprise a first field; the first field is used for determining K1 codeword(s) from a first codebook, and the K1 codeword(s) is(are) used for determining a transmitting antenna port(s) of the first radio signal; the first codebook comprises a positive integer number of codewords; and the K1 is a positive integer.

20. The base station according to claim 16, wherein whether the first radio signal is related to the first air interface resource or the second air interface resource is used to determine whether the scheduling information of the first radio signal is based on codebook-based precoding or based on non-codebook-based precoding.

* * * * *